US006314296B1

United States Patent
Hamada et al.

(10) Patent No.: US 6,314,296 B1
(45) Date of Patent: *Nov. 6, 2001

(54) WIRELESS COMMUNICATION SYSTEM AND METHOD OF CONTROLLING SAME

(75) Inventors: Masashi Hamada, Tokyo; Shunji Arai, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,193

(22) Filed: Mar. 10, 1997

(30) Foreign Application Priority Data

Mar. 15, 1996 (JP) .................................. 8-059161

(51) Int. Cl.[7] ............................ H04Q 7/20; H04M 11/00
(52) U.S. Cl. ........................ 455/456; 455/461; 455/404
(58) Field of Search .................................. 455/456, 436, 455/457, 415, 440, 461, 435, 426, 422, 404, 405

(56) References Cited

U.S. PATENT DOCUMENTS

| H1641 | * | 4/1997 | Sharman | 370/338 |
|---|---|---|---|---|
| 5,168,498 | * | 12/1992 | Adams et al. | 370/349 |
| 5,259,021 | * | 11/1993 | Antilla et al. | 455/465 |
| 5,325,419 | * | 6/1994 | Connolly et al. | 455/435 |
| 5,384,824 | * | 1/1995 | Alvesalo | 455/456 |
| 5,388,147 | * | 2/1995 | Grimes | 455/404 |
| 5,434,904 | * | 7/1995 | Tsuzuki et al. | 455/456 |
| 5,438,609 | * | 8/1995 | Yahagi | 455/456 |
| 5,444,760 | * | 8/1995 | Russ | 379/45 |
| 5,479,482 | * | 12/1995 | Grimes | 455/556 |
| 5,481,591 | * | 1/1996 | Suzuki | 455/456 |
| 5,519,760 | * | 5/1996 | Borkowski et al. | 455/404 |
| 5,548,637 | * | 8/1996 | Heller et al. | 379/201 |
| 5,570,412 | * | 10/1996 | LeBlanc | 456/456 |
| 5,740,538 | * | 4/1998 | Joyce et al. | 455/456 |
| 5,787,354 | * | 7/1998 | Gray et al. | 455/456 |
| 5,835,907 | * | 11/1998 | Newman | 770/10 |
| 5,842,131 | * | 11/1998 | Yamane | 455/456 |
| 5,873,041 | * | 2/1999 | Ishii | 455/457 |
| 5,875,401 | * | 2/1999 | Rochkind | 455/466 |
| 5,953,654 | * | 9/1999 | Li | 455/411 |
| 6,009,321 | * | 12/1999 | Wang et al. | 455/410 |
| 6,061,561 | * | 5/2000 | Alanara et al. | 455/422 |

FOREIGN PATENT DOCUMENTS 451281    2/1992  (JP) .

OTHER PUBLICATIONS

U.S. application No. 08/685,397, Jul. 23, 1996.

* cited by examiner

*Primary Examiner*—Vivian Chang
*Assistant Examiner*—Charles N. Appiah
(74) *Attorney, Agent, or Firm*—Morgan & Finnegan, L.L.P.

(57) ABSTRACT

The position registration function of a cellular wireless communication apparatus is utilized to specify the position of the apparatus, notification of which is given to a communicating party. By additionally notifying the communicating party of identification information representing the wireless communication apparatus, the communicating party can use this information in judging whether or not to answer the call. Further, route traveled by the wireless communication apparatus is specified using the position registration function, and the transportation fare required for such travel is calculated.

54 Claims, 20 Drawing Sheets

FIG. 14

| CS-ID | BASE STATION LOCATION |
|---|---|
| 10000001 0000 0000 0000 0000 0000 0001 0000 0000 0000 0000 0000 0000 0001 | 3-30-XX SHIMOMARUKO, OTA-KU, TOKYO |
| 10000001 0000 0000 0000 0000 0000 0001 0000 0000 0000 0000 0000 0001 0 | 3-30-XY SHIMOMARUKO, OTA-KU, TOKYO |
| 10000001 0000 0000 0000 0000 0000 0001 0000 0000 0000 0000 0000 0001 1 | 3-30-XZ SHIMOMARUKO, OTA-KU, TOKYO |
| 10000001 0000 0000 0000 0000 0000 1001 0000 0000 0000 0000 0000 0001 1 | X-X-X KAMATA, OTA-KU, TOKYO |
| 10000001 0000 0000 0000 0000 0000 1001 0000 0000 0000 0000 0000 0010 0 | X-X-Y KAMATA, OTA-KU, TOKYO |
| 10000001 0000 0000 0000 0100 1001 0000 0000 0000 0000 0000 0011 0 | X-X-X KIKUNA, MINATO KITA-KU, YOKOHAMA |
| 10000001 0000 0000 0000 0100 1001 0000 0000 0000 0000 0000 0011 0 | X-X-Y KIKUNA, MINATO KITA-KU, YOKOHAMA |

FIG.15

| | KAMATA | YAGUCHI | NITTA | SHIMOMARUKO | | MEGURO |
|---|---|---|---|---|---|---|
| YAGUCHI | 110 | | | | | |
| NITTA | 110 | 110 | | | | |
| SHIMOMARUKO | 110 | XXX | XXX | | | |
| UNOKI | XXX | XXX | XXX | XXX | | |
| MEGURO | XXX | XXX | XXX | XXX | | XXX |

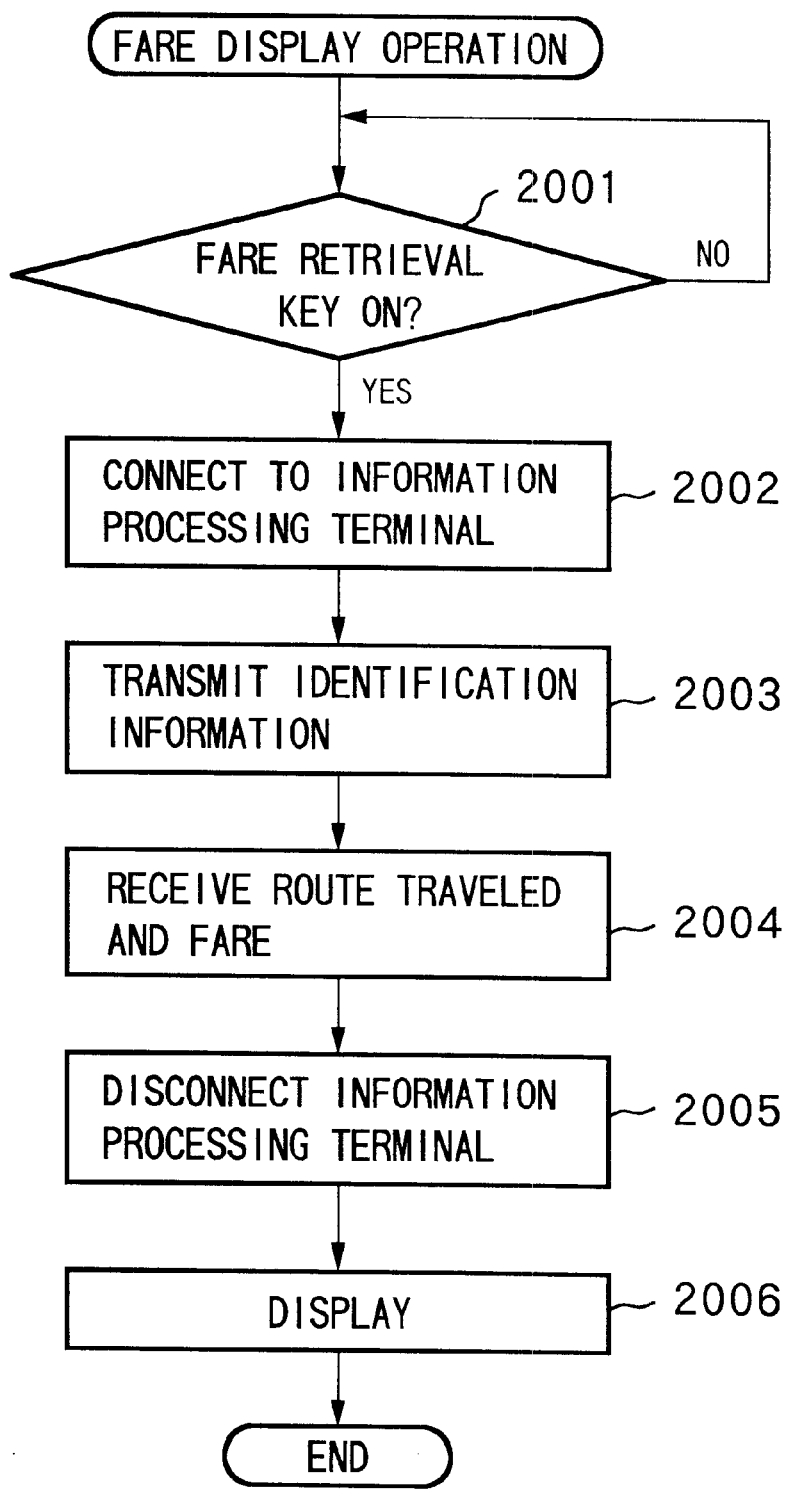

WIRELESS COMMUNICATION SYSTEM AND METHOD OF CONTROLLING SAME

BACKGROUND OF THE INVENTION

1. Field of the Invention

This invention relates to a wireless communication system, which has a position registration function and uses a cellular scheme, as well as to a method of controlling this system.

2. Description of the Related Art

An example of a system for specifying present position is a navigation system the medium of which is a GPS (Global Positioning System) in which latitude and longitude are determined from radio-wave information received from a communications satellite in space.

In a system currently available, one specifies one's present position utilizing a navigation system, places a telephone call using a portable telephone and communicates this information to the navigation system of the called party, thereby notifying the called party of one's own position.

Further, in a cellular-type wireless telecommunication system, a wireless base station periodically transmits identification information that is for identifying the wireless base station. Upon receiving the identification information representing the wireless base station, a wireless telecommunication terminal stores this identification information and transmits its own identification information to notify the wireless base station of its own present position. This operation is performed whenever the wireless base station changes. New identification information is stored in place of the old identification information whenever the wireless base station changes.

However, since the system utilizing the GPS in the above-described example of the prior art specifies position by satellite, position information cannot be acquired in case of motion underground, as in a subway or underground passageway, because radio waves from the satellite cannot reach the moving object.

Further, in a case where one's own position is communicated to another party by a portable telephone, one s own position is transmitted by the portable telephone after a response is received. Since this means that one cannot inform of one's own position before communication starts, position information cannot be utilized in judging whether to respond to a communication. Furthermore, if the other party also does not possess map data, notification of position cannot be given.

In addition, information relating to the possessor of a wireless telecommunication terminal cannot be sent to a communicating party.

Further, the automatic position registration function is such that new identification information is stored in place of identification information that has already been stored. However, since a wireless telecommunication terminal recognizes only the new (latest) wireless base station at all times, the wireless telecommunication terminal is incapable of determining via which wireless base stations it has traveled.

SUMMARY OF THE INVENTION

An object of the present invention is to furnish a wireless communication apparatus with a number of functions.

Another object of the present invention is to make it possible to obtain information indicative of the position of a wireless communication apparatus even when the apparatus is located where it cannot be reached by radio waves from a satellite.

Another object of the present invention is to so arrange it so that position information on the calling side can be communicated to a communicating party.

A further object of the present invention is to so arrange it so that position information on the calling side can be communicated to a communicating party before the communication party responds.

A further object of the present invention is to so arrange it so that position information from the calling side can be used on the called side as a factor in judging whether to respond or not.

Still another object of the present invention is to effectively exploit the position registration function of a wireless communication apparatus.

Still another object of the present invention is to specify and display the traveling path of a wireless communication apparatus using the position registration function of the wireless communication apparatus.

Still another object of the present invention is to calculate, from the traveling path of a wireless communication apparatus, the transportation fare that would be needed for such travel, and to notify of this transportation fare.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a diagram showing an example of data stored in a database according to the fifth embodiment;

FIG. 15 is a diagram showing an example of data stored in a database according to the fifth embodiment;

FIG. 20 is a flowchart of an operation for displaying a fare according to the sixth embodiment.

DESCRIPTION OF THE PREFERRED EMBODIMENTS (First Embodiment)

A first embodiment of the invention deals with a TV telephone system, which employs the Personal Handyphone System (PHS) as a wireless telecommunication medium. This is one of the microcell-type wireless telecommunication systems having a position registration function. It should be noted, however, that the present invention is not limited to the PHS but is applicable to all digital cordless telephones.

Figure 1:
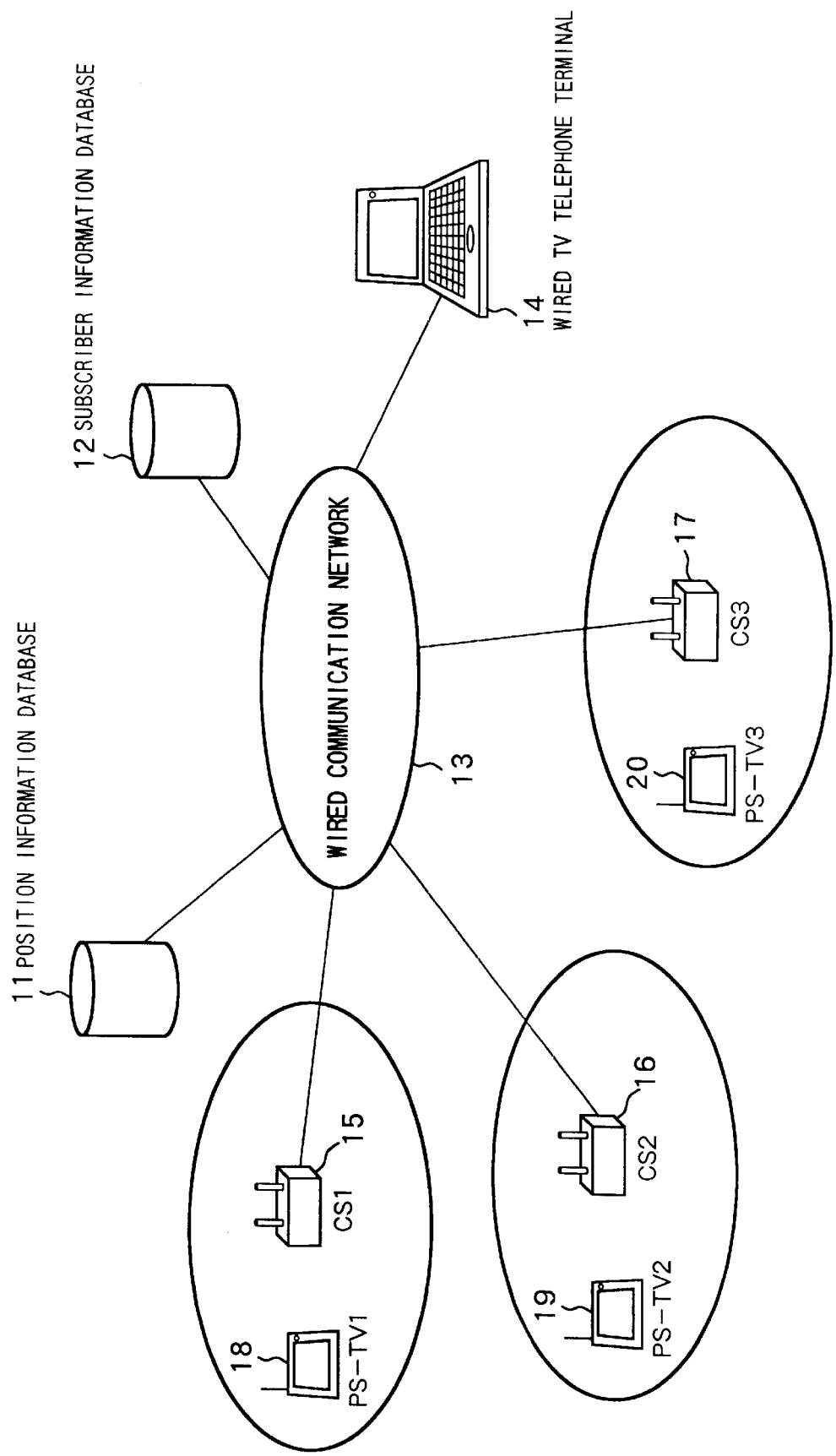
FIG. 1 is a conceptual view of a PHS-based TV telephone system according to first and second embodiments of the invention.

FIG. 1 is a conceptual view of a TV telephone system using a PHS as the medium.

As shown in FIG. 1, the system includes a position information database 11 for storing, in correlated form, identification information for identifying deployed wireless base stations 15~17 and information representing areas covered by these wireless base stations; a subscriber information database 12 for storing, in correlated form, identification information for identifying wireless telecommunication terminals 18~20 and information relating to the subscribers of these terminals; and a wired communication network 13 to which the databases 11, 12, wireless base stations 15~17 and a wired communication terminal 14 are connected.

Figure 2:
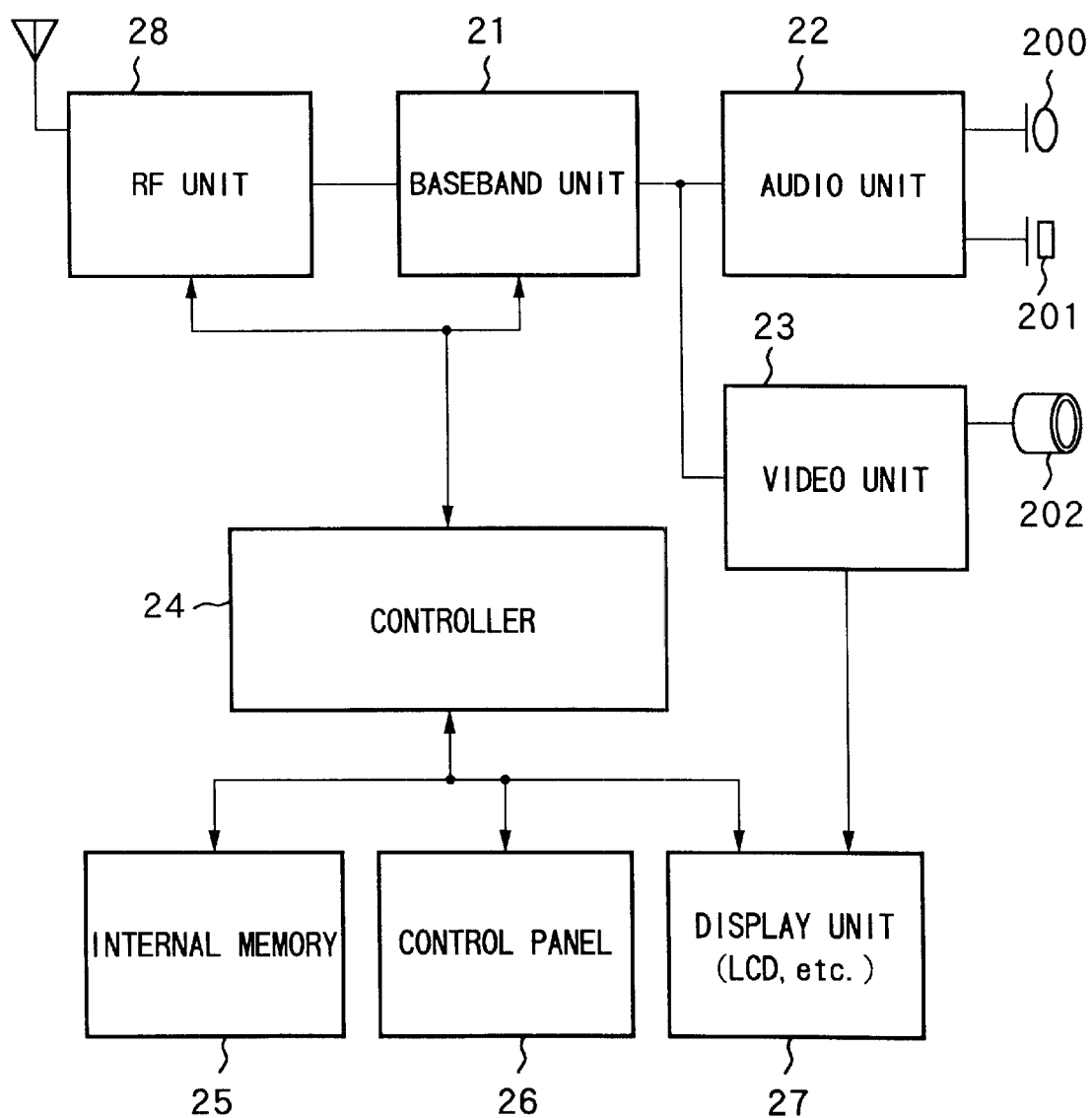
FIG. 2 is a functional block diagram illustrating the PHS-based TV telephone system of the first and second embodiments.

FIG. 2 is a block diagram of a PHS wireless TV telephone terminal according to this embodiment.

As shown in FIG. 2, the terminal includes a wireless unit (RF unit) 28 for wirelessly sending and receiving radio waves, a baseband unit 21 for converting a baseband signal from an audio unit or controller to a wireless signal or converting a signal from the RF unit to a baseband, an audio unit 22 for controlling input/output of audio signals, a video unit 23 for controlling input/output of video signals, a controller 24 for performing overall control of the PHS wireless TV telephone terminal, and an internal memory 25, constituted by a ROM or RAM, for storing program information in accordance with which the controller 25 controls the PHS wireless TV telephone terminal, as well as IDs and information sent and received by the RF unit 20. The terminal further includes a control panel 26, which is for operating the PHS wireless TV telephone terminal and has a hook key for performing on-hook and off-hook operations, numeric keys for entering numbers, and a function key for selecting whether or not to communicate the originating location and subscriber information representing the originating party. Further included are a display unit 27 for displaying various information such as information received from the RF unit 20, a microphone 200 for entering an audio signal, a speaker 201 for outputting an audio signal, and a video input unit 202, comprising lenses and the like, for entering a video signal.

Figure 3:
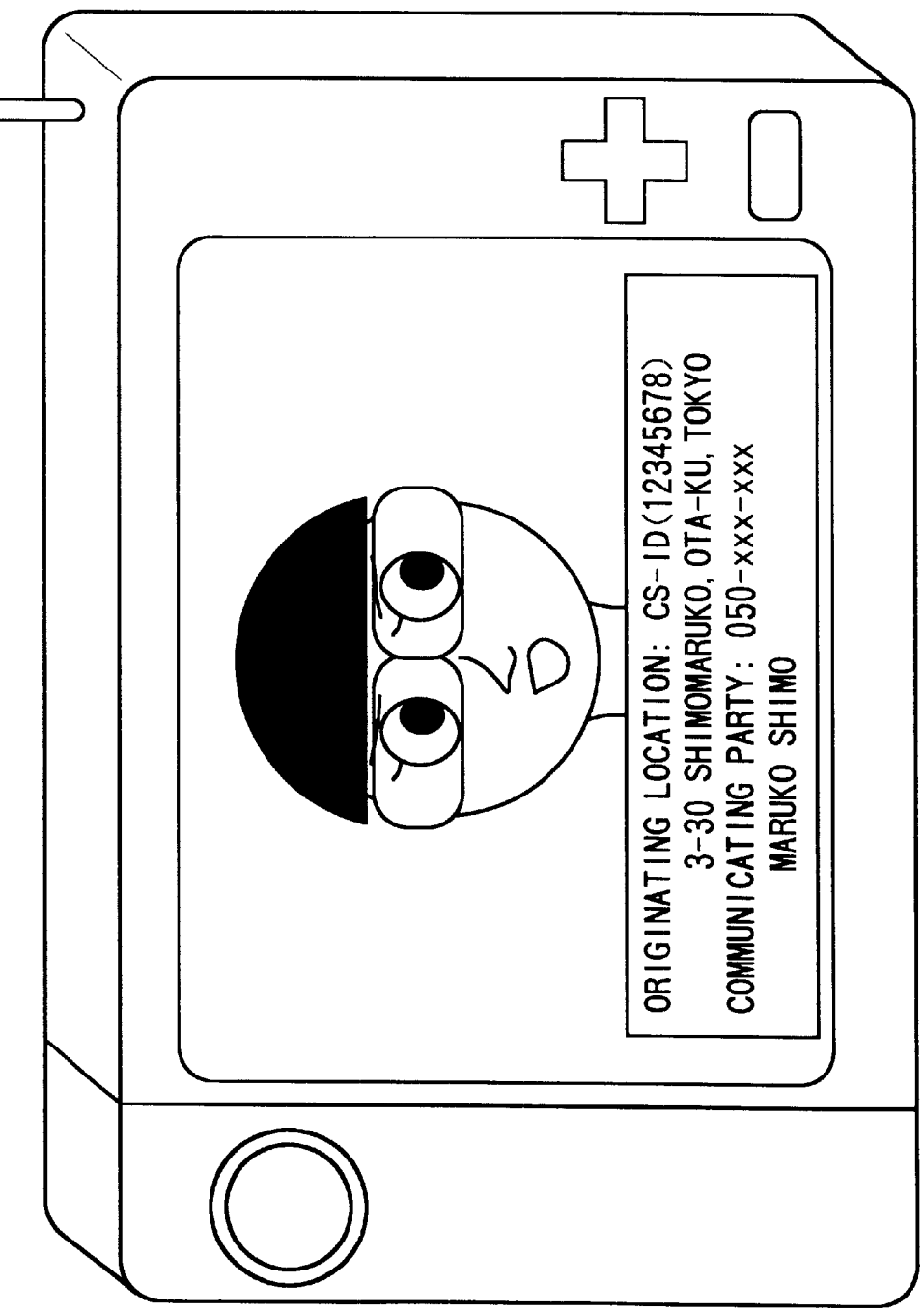
FIG. 3 is a diagram illustrating an example of an information display presented by the PHS-based TV telephone system of the first and second embodiments.

FIG. 3 is a diagram illustrating an example of a display of position information and subscriber information presented by the PHS wireless TV telephone terminal.

As shown in FIG. 3, the display presented includes position information, namely the ID of the wireless base station (CS) with which the PHS wireless TV telephone terminal is currently communicating as well as the location of this wireless base station, and subscriber information, namely the telephone number and name of the communicating party.

Figure 4:
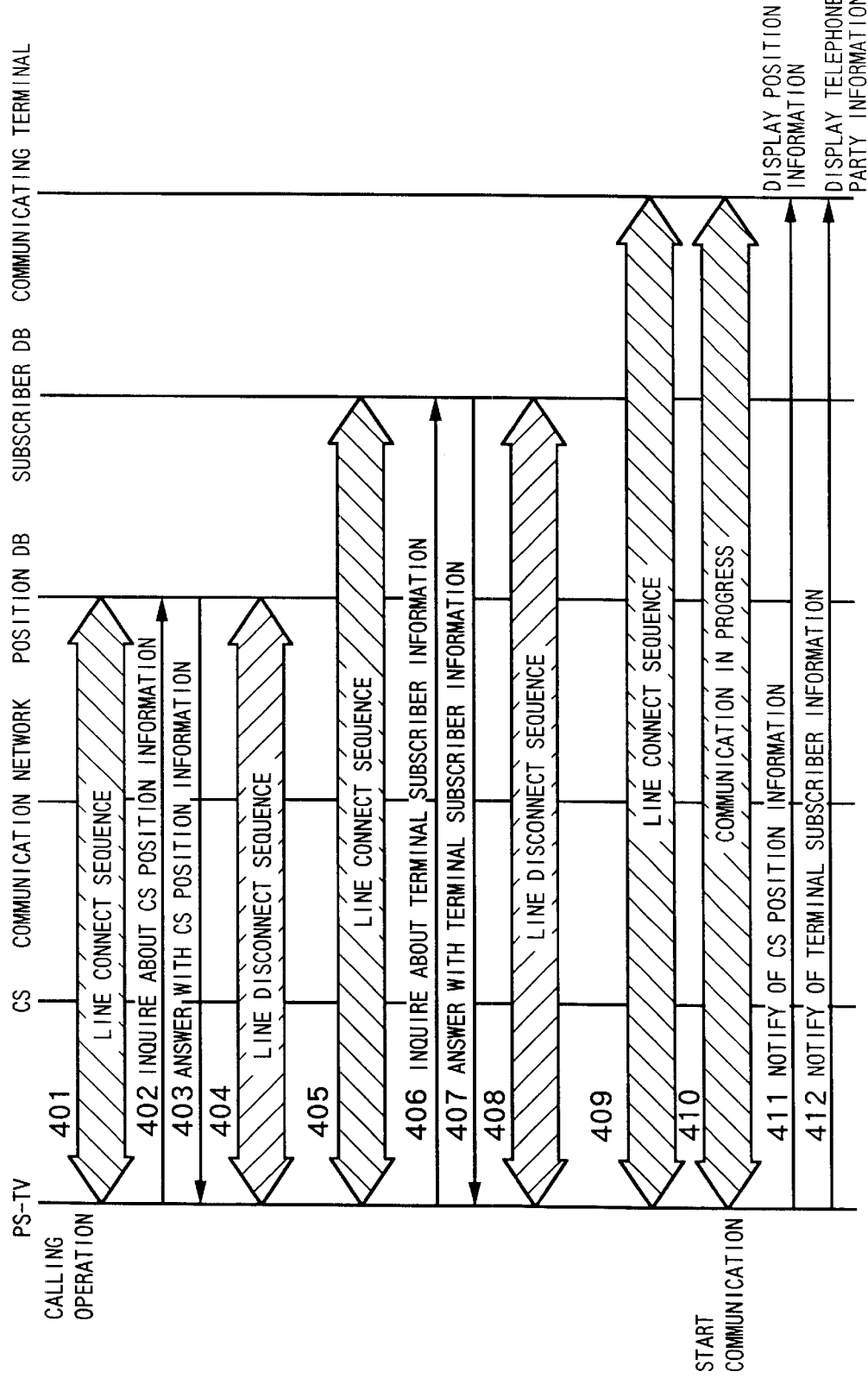
FIG. 4 is a sequence chart according to the first embodiment of the invention.

FIG. 4 is an example of a sequence for accessing the above-mentioned position information database and subscriber information database when the PHS wireless TV telephone terminal places a call in the wireless telecommunication system according to this embodiment.

The above-mentioned databases are accessed (401~408) before a line connection sequence (409) for effecting a connection to a communicating party (the party that has been designated by the call operation) is started.

In response to the call operation performed by the operator, the PHS wireless TV telephone terminal (PS-TV) effects a line connection (401) with the position information database (position DB) 11 and, in order to obtain position information indicative of the position of a wireless base station (CS) used in the connection to the wired communication network 13, inquires (402) with regard to this position information using the identification information of the wireless base station (CS) as a search condition. It should be noted that this identification information is the ID of the wireless base station stored by the position registration function.

In response to this inquiry, the position information database 11 sends back (403) information relating to the area covered by the wireless base station (CS) for which matching with the base-station identification information of the above-mentioned search condition has been achieved. An example of this information is the ID and location of the wireless base station (CS), as shown in FIG. 3.

Upon receiving this information, the PHS wireless TV telephone terminal (PS-TV) temporarily stores the installation position information of the wireless base station in the internal memory 25 and disconnects the line to the position information database 11 (404).

Next, the PHS wireless TV telephone terminal (PS-TV) connects the line (405) to the subscriber information database (subscriber DB) 12 and, in order to obtain detailed information on the service subscriber of the PHS wireless TV telephone terminal (PS-TV), inquires (406) with regard to the subscriber information using the identification information of the PHS wireless TV telephone terminal as a search condition. In this case the identification information is the ID or telephone number of the PHS wireless TV telephone terminal.

In response to this inquiry, the subscriber information database 12 sends back (407) information relating to the PHS service subscriber for which matching has been achieved with the identification information of the PHS wireless TV telephone terminal constituting the above-mentioned search condition. An example of this information is the telephone number and name of the PHS wireless TV telephone terminal possessed by the service subscriber.

Upon receiving this information, the PHS wireless TV telephone terminal (PS-TV) temporarily stores the information relating to the PHS service subscriber in the internal memory 25 and disconnects the line to the subscriber information database 12 (408).

Next, after the line has been connected (409, 410) to the communicating party (the party designated by the call operation), the area information on the area covered by the wireless base station (CS) and the terminal subscriber information stored in the internal memory 25 is communicated (411, 412) to the communicating party. At this time an audio signal acquired from the microphone 200 or a video signal acquired from the video input unit 202 is transmitted to the RF unit 20.

Upon receiving these items of information, the PHS wireless TV telephone terminal of the communicating party displays the received information and video, as shown in FIG. 3, and outputs the received audio.

When the received information is displayed on the side of the communicating party, the operator on this side observes the display and decides whether to respond or not. When the operator performs an operation for responding, a state of communication is attained.

Figure 5:
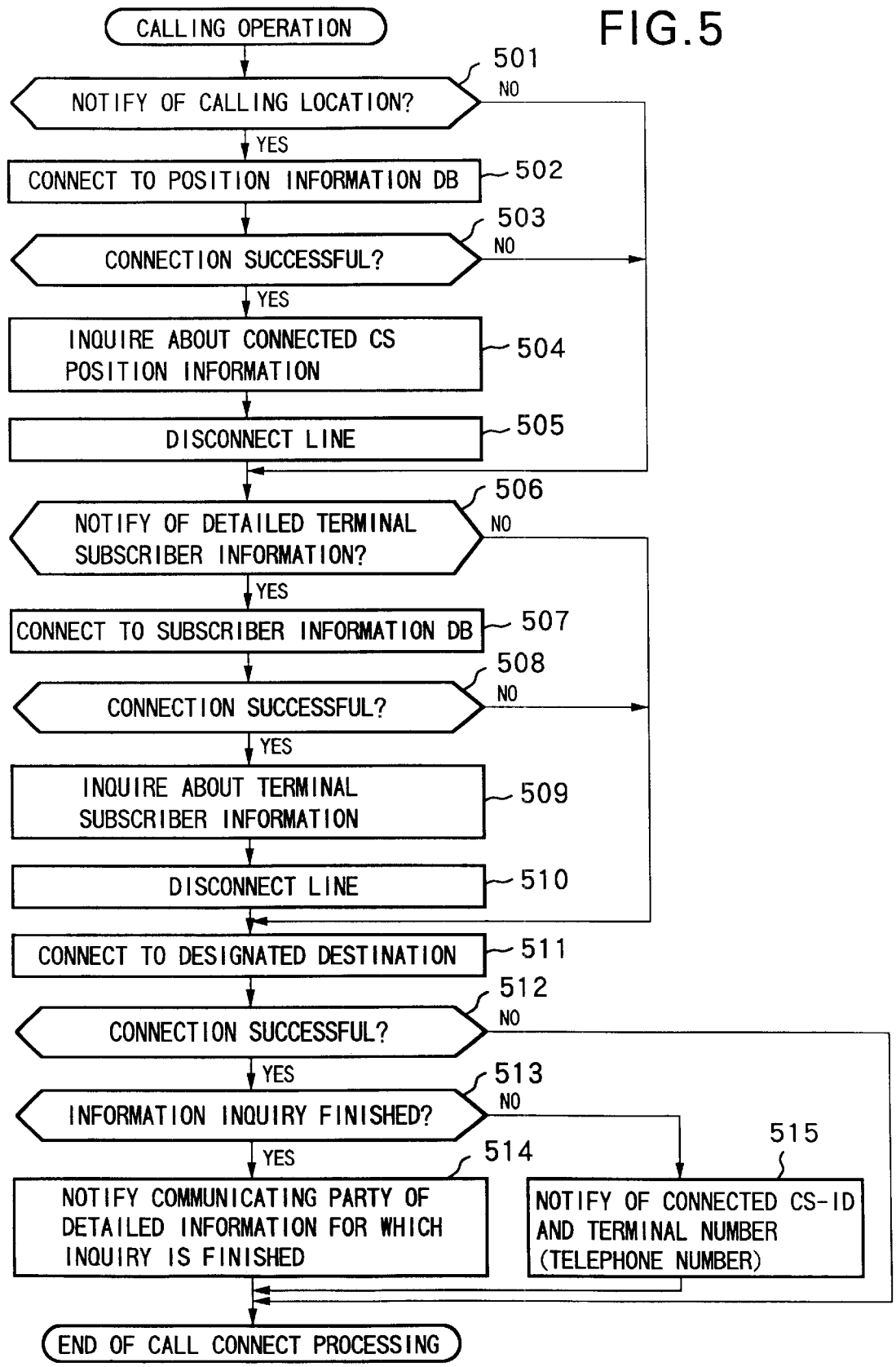
FIG. 5 is a terminal flowchart when a call is made according to the first embodiment.

FIG. 5 is a flowchart of processing executed when the PHS wireless TV telephone terminal (PS-TV) performs a call operation.

When the operator has placed a call, the controller 24 determines, based upon the operation performed by the operator at the control panel 26, whether to notify the communicating party of the location from which the call has been made (step 501). It should be noted that, by way of the position registration information, the PHS wireless TV telephone terminal (PS-TV) stores identification information such as the ID of the wireless base station used in communication. In a case where notification of the location is to be given ("YES" at step 501), the controller 24 connects the transmission to the position information database 11 (step 502). When the connection is made (503), the controller 24 sends the identification information of the wireless base station (CS) used in the connection to the position information database 11 and, when the area information of the present position has been received (504), disconnects the line. At this time the position information database 11 retrieves information such as the location of the wireless base station and transmits this information to the PHS wireless TV telephone terminal. In a case where notification of the location is not to be given ("NO" at step 501), the controller 24 does not make a connection to the position information database 11.

Next, the controller 24 determines (step 506), based upon the operation performed by the operator at the control panel 26, whether to notify the communicating party of detailed information on the terminal subscriber. In a case where notification of the detailed information is to be given ("YES" at step 506), the controller 24 connects the transmission to the subscriber information database 12 (step 507). If the connection is established ("YES" at step 508), then the controller 24 sends the identification information of the PHS wireless TV telephone terminal that originated the call to the subscriber information database 12 and, when the detailed information on the terminal subscriber has been received (step 509), disconnects the line (step 510). At this time the subscriber information database retrieves the name of the possessor of the terminal and the telephone number of the terminal based upon the received identification information and transmits the same to the PHS wireless TV telephone terminal. In a case where notification of the detailed information is not to be given ("NO" at step 506), the controller 24 does not make a connection to the subscriber information database 12.

When each database inquiry has been completed, the controller 24 makes a transmission to the designated destination (511). If the connection is established ("YES" at step 512), then it is determined whether the inquiry for information is finished (513). If the answer is "YES", then each item of detailed information obtained by the inquiry is sent to the communicating party (514). In a case where the inquiry for information has not been made on the calling side ("NO" at step 513), then the controller 24 gives notification of the conditions for searching the databases, such as the identification information of the connected wireless base station and the ID or terminal number (telephone number) of this terminal, so that the databases may be searched on the side of the communicating party (515).

The detailed information that has been received is displayed on the side of the communicating party in the manner shown in FIG. 3.

Thus, the position information database is accessed from the wireless telecommunication terminal via the wireless base station and communication network immediately after the wireless telecommunication terminal performs the call operation, and information indicating the area covered by the wireless base station, such as the location of the wireless base station, is extracted from the identification information of the connected wireless base station. After the connection of the communication line to the communicating party is achieved, the extracted information is sent to the communicating party. The service subscriber information database is accessed and the information representing the service subscriber of the wireless telecommunication terminal on the calling side is extracted from the identification information of this wireless telecommunication terminal. After the connection of the communication line to the communicating party is achieved, the extracted information is sent to the communicating party.

As a result of this operation, it is possible to notify the communicating party of accurate calling position information and of subscriber information relating to the subscriber of the terminal being used.

(Second Embodiment)

The first embodiment deals with a situation in which one PHS wireless TV telephone terminal is capable of acquiring one communication channel. In a second embodiment of the invention, described below, one PHS wireless TV telephone terminal is capable of acquiring a plurality of communication channels.

Figure 6:
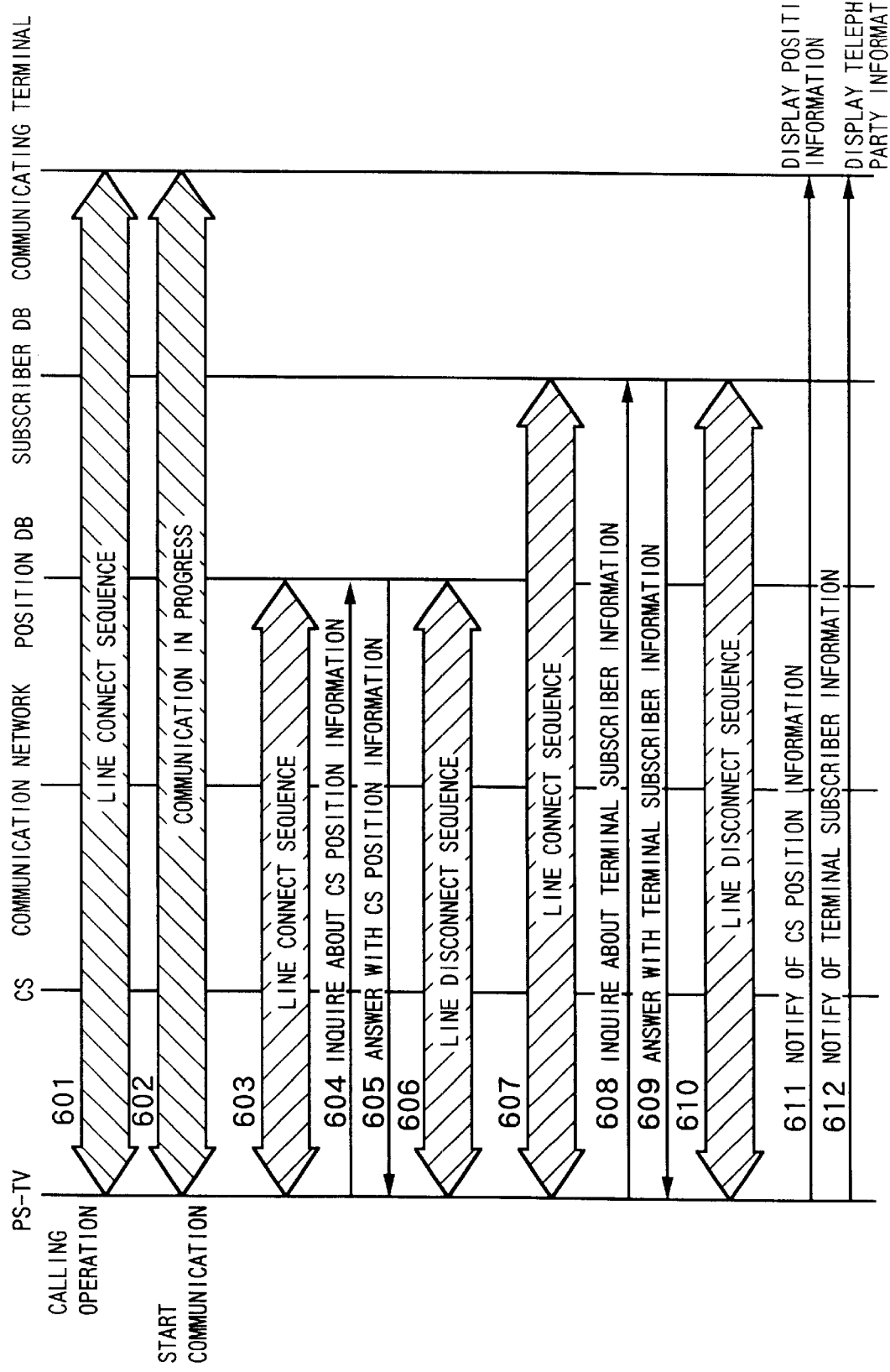
FIG. 6 is a sequence chart according to the second embodiment of the invention.

FIG. 6 is an example of a sequence for accessing the above-mentioned position information database and subscriber information database when the PHS wireless TV telephone terminal places a call in the wireless telecommunication system according to the second embodiment.

As shown in FIG. 6, a line connection sequence for establishing a connection with a communicating party (a party that has been designated by the call operation) is started (601) and then the line is connected to the communicating party (602). Then, using a communication channel different from that used for the above-mentioned connection to the communicating party, each of the databases is accessed (603~610).

After the connection of the call to the communicating party is completed, the PHS wireless TV telephone terminal (PS-TV) connects the line (603) to the position information database 11 and, in order to obtain position information indicative of the position of the wireless base station (CS)

used in making the connection, asks the position information database 11 about this position information (604) using the identification information of the wireless base station (CS) as a search condition.

In response to this inquiry, the position information database 11 sends back (605) information relating to the area covered by the wireless base station (CS) for which matching with the above-mentioned search condition has been achieved.

Upon receiving this information, the PHS wireless TV telephone terminal (PS-TV) temporarily stores the installation position information of the wireless base station (CS) in the internal memory 25 and disconnects the line to the position information database 11 (606).

Next, the PHS wireless TV telephone terminal (PS-TV) connects the line (607) to the subscriber information database 12 and, in order to obtain detailed information on the service subscriber of the PHS wireless TV telephone terminal (PS-TV), inquires (608) with regard to the subscriber information using the identification information of the PHS wireless TV telephone terminal as a search condition.

In response to this inquiry, the subscriber information database 12 sends back (609) information relating to the PHS service subscriber for which matching with the above-mentioned search condition has been achieved. An example of this information is the name of the PHS service subscriber and the telephone number the PHS wireless TV telephone terminal.

Upon receiving this information, the PHS wireless TV telephone terminal (PS-TV) temporarily stores the information relating to the PHS service subscriber in the internal memory 25 and disconnects the line to the subscriber information database 12 (610).

Thereafter, the area information on the area covered by the wireless base station and the PHS service subscriber information stored in the internal memory 25 is communicated (611, 612) to the communicating party.

Figure 7:
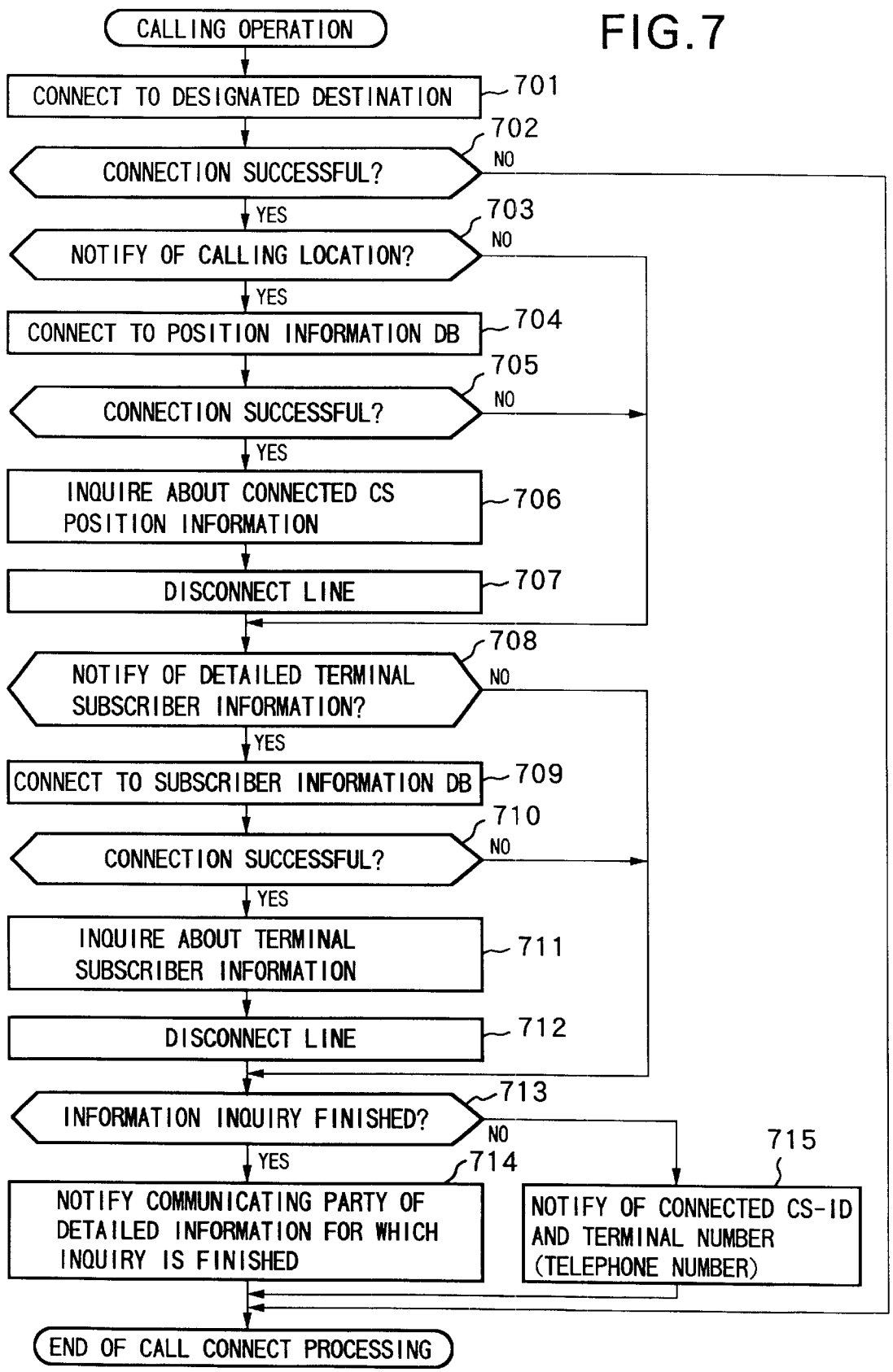
FIG. 7 is a terminal flowchart when a call is made according to the second embodiment.

FIG. 7 is a flowchart of processing executed when the PHS wireless TV telephone terminal (PS-TV) performs a call operation in the second embodiment.

When the operator has placed a call, the controller 24 makes a transmission to the call destination designated by operation of the control panel 26 (701) and makes the connection (702).

Next, the controller 24 determines, based upon the operation performed by the operator at the control panel 26, whether to notify the communicating party of the location from which the call has been made (703). In a case where notification of the location is to be given ("YES" at 703), the controller 24 makes a transmission (704) to the position information database 11 using a channel not used in making the connection to the communicating party based upon the call, establishes a connection (705), sends the identification information of the wireless base station (CS) used in the connection to the position information database 11 and, when the area information of the present position has been received (706), disconnects the line (707). At this time the position information database 11 retrieves information such as the location of the wireless base station from the received identification information and transmits this information to the calling party. In a case where notification of the location is not to be given ("NO" at 703), the controller 24 does not make a connection to the position information database 11.

Next, the controller 24 determines (708), based upon the operation performed by the operator at the control panel 26, whether to notify the communicating party of detailed information on the terminal subscriber. In a case where notification of the detailed information is to be given ("YES" at 708), the controller 24 makes a transmission (709) to the subscriber information database 12 using a channel not used in making the connection to the communicating party based upon the call. If the connection is established ("YES" at 710), then the controller 24 sends the identification information of the PHS wireless TV telephone terminal (PS-TV) that originated the call to the subscriber information database 12 and, when the detailed information on the terminal subscriber has been received (711), disconnects the line (712). At this time the subscriber information database 12 retrieves the name and telephone number of the transmitting party from the received identification information and transmits the same to the transmitting party. In a case where notification of the detailed information is not to be given ("NO" at 708), the controller 24 does not make a connection to the subscriber information database 12.

When each database inquiry has been completed, the controller 24 determines whether an inquiry for information is finished (713). If the answer is "YES", then each item of detailed information obtained by the inquiry is sent to the communicating party (714). In a case where the inquiry has not been made on the calling side ("NO" at 713), then the controller 24 gives notification of the conditions for searching the databases, such as the identification information (CS-ID) of the wireless base station that was used in making the connection and the terminal number (ID or telephone number) of this terminal (715).

The information that has been received is displayed on the side of the communicating party in the manner shown in FIG. 3.

Thus, following the connection of the line to the communicating party after the wireless telecommunication terminal performs the call operation, the position information database is accessed from the wireless telecommunication terminal via the wireless base station and communication network using a telecommunication channel not used in the line connection to the communicating party, and information indicating the area covered by the wireless base station, such as the location of the wireless base station, is extracted from the identification information of the wireless base station that was used in making the connection. The extracted information is sent to the communicating party. The service subscriber information database is accessed and information such as the name of the service subscriber of the wireless telecommunication terminal that was used in making the connection and the dialing number of the wireless telecommunication terminal is extracted from the identification information of this wireless telecommunication terminal. The extracted information is sent to the communicating party.

As a result of this operation, it is possible to notify the communicating party of accurate calling position information and of subscriber information relating to the subscriber of the terminal being used. This can be accomplished while making the time required for establishing the connection to the communicating party shorter than that needed in the first embodiment.

(Third Embodiment)

Figure 8:
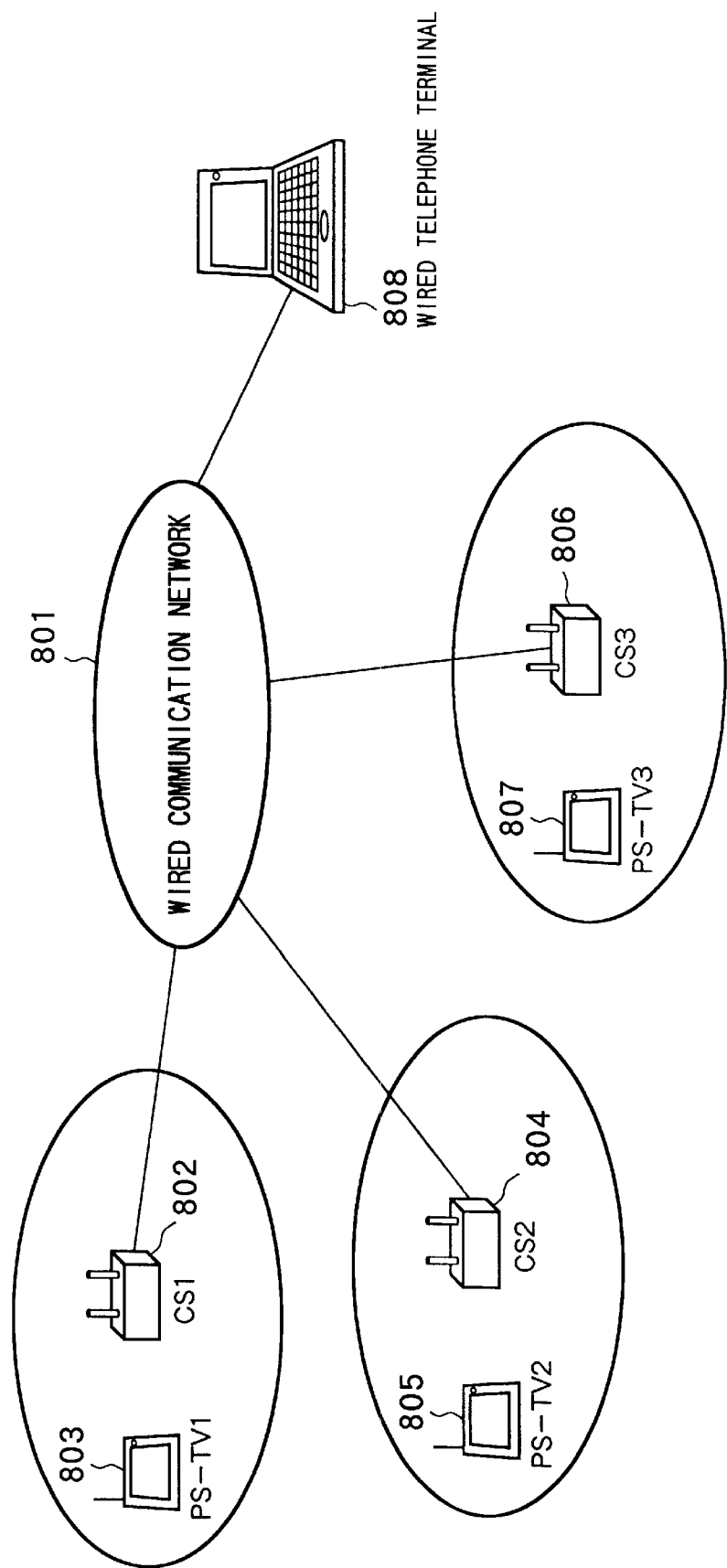
FIG. 8 is a diagram showing the system configuration of third and fourth embodiments of the invention.

A third embodiment of the invention will be now be described taking the PHS (Personal Handyphone System) as an example of a microcell wireless telecommunication system. FIG. 8 is a diagram showing the system configuration of the third embodiment. The system includes a wired communication network 801 which includes a network of PHS communication businesses, base stations 802, 804, 806 which cover their respective areas and periodically transmit their own identification information, wireless telecommunication terminals 803, 805, 807 in which the positions of the respective nearby base stations have been registered, and a wired telephone terminal 808 connected to the wired network.

Figure 9:
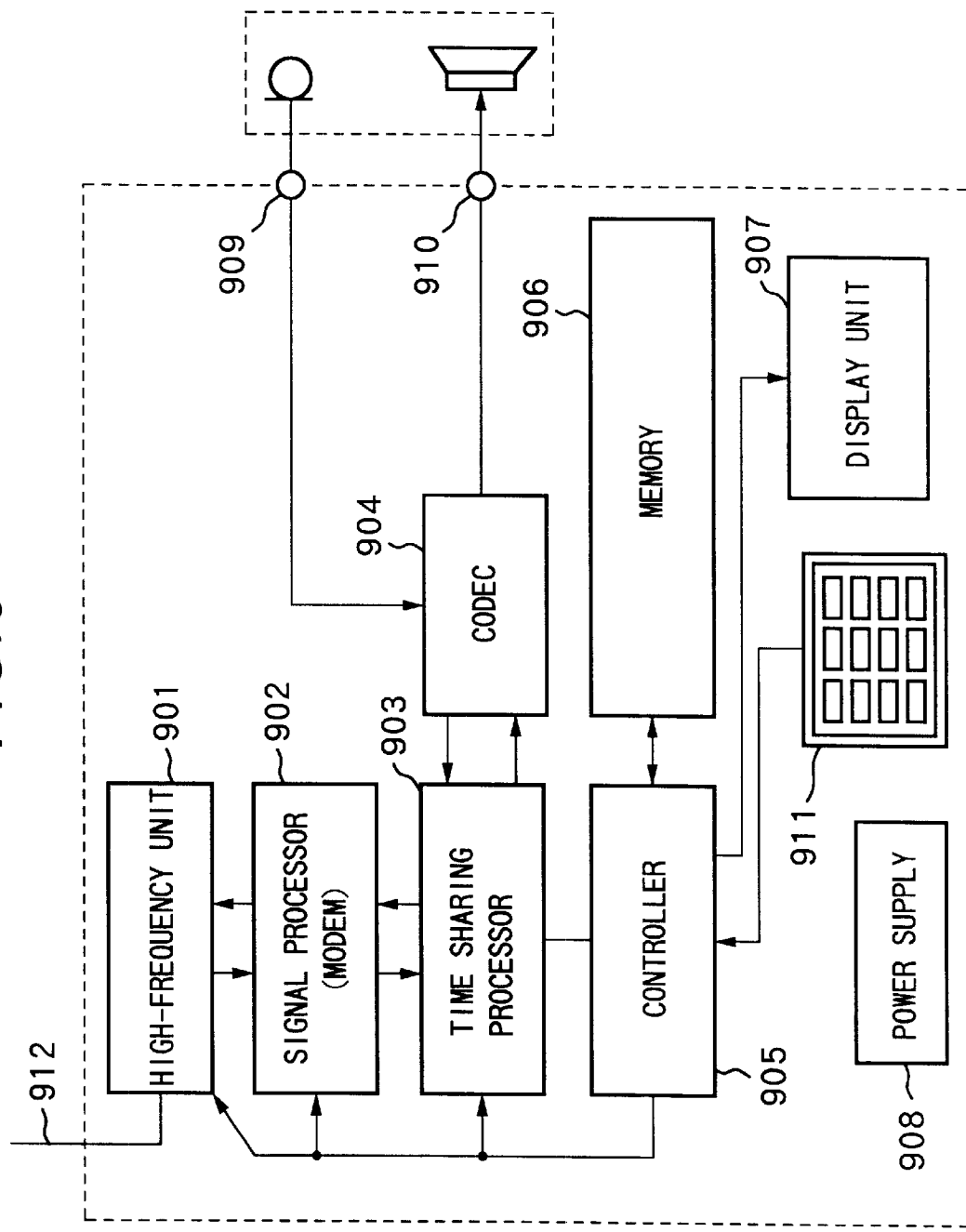
FIG. 9 is a block diagram of a wireless telecommunication terminal according to the third embodiment.

FIG. 9 is a block diagram of a wireless telecommunication terminal according to the third embodiment.

As shown in FIG. 9, the wireless telecommunication terminal includes a high-frequency unit 901 for wireless communication with a base station, a signal processor 902 for modulating and demodulating signals, a time sharing processor 903 for analyzing data sent from a base station and assembling transmission data in a time-shared transmission format, a codec 904 for converting an analog signal to a digital signal and converting a digital signal to an analog signal, a controller 905 for implementing overall control of the wireless terminal, a memory 906, in which a program executed by the controller 905 to control the wireless terminal as well as data for specifying the position of a wireless base station from identification information received from a wireless base station, a display unit 907 for displaying information such as information representing the position of the communicating party, a power supply 908, audio input/output units 909, 910 for connecting a headset or the like, a keypad 911 for entering the telephone number of a destination, etc., and an antenna 912 for sending and receiving radio waves.

Figure 10:
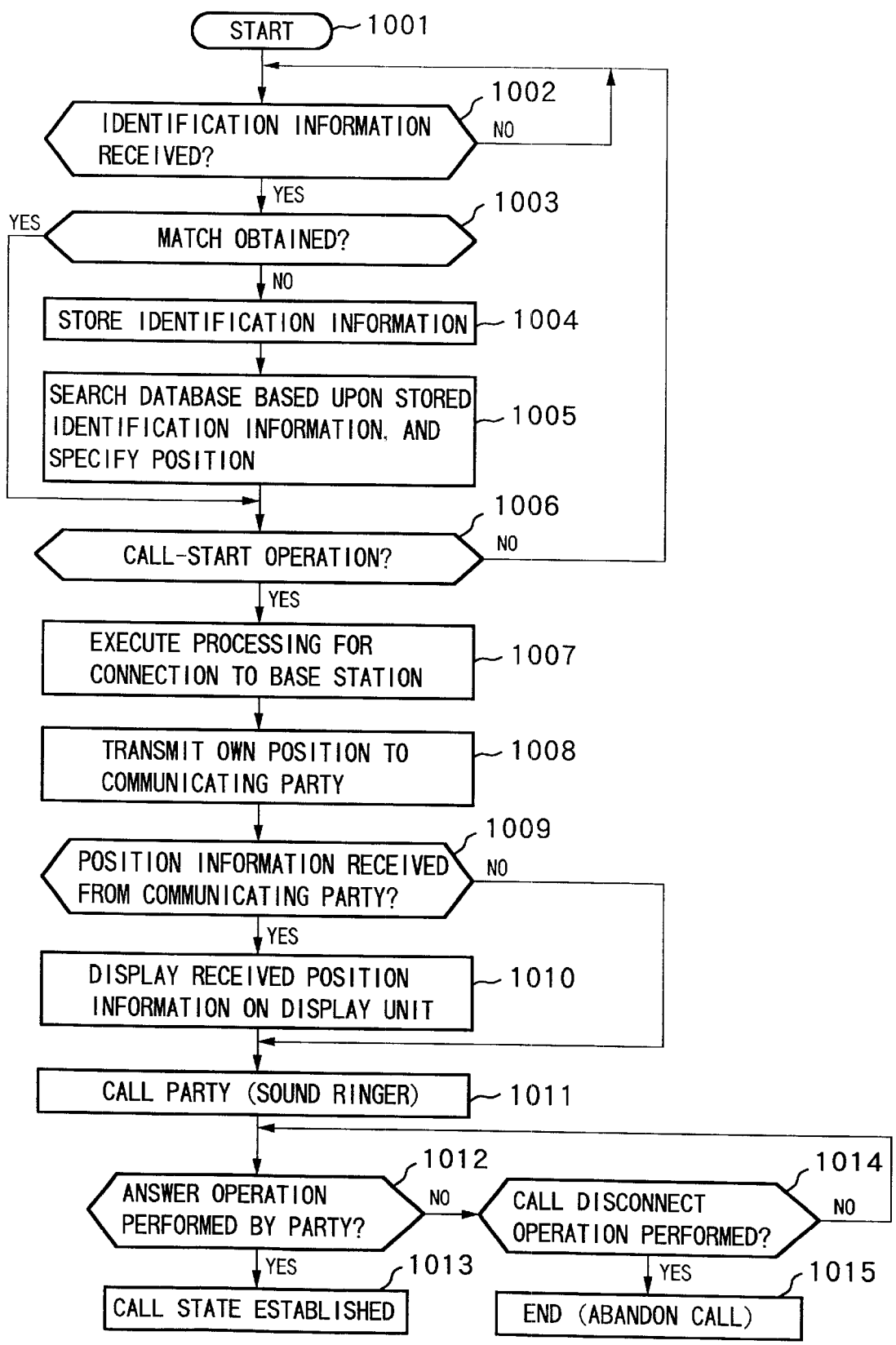
FIG. 10 is an operating flowchart according to the third and fourth embodiments.

FIG. 10 is a flowchart illustrating operation of a wireless telecommunication terminal according to this embodiment.

With the wireless telecommunication terminal being in the powered state and in use (1001), it is determined whether identification information specific to a base station has been received from this base station (1002). If the information has been received, a comparison is performed to determine whether the information matches identification information that has already been stored in the memory 906 (1003). If a match is obtained, the program proceeds to step 1006. If there is no match, then the identification information received is stored in the memory 906 (1005).

It should be noted that if identification information has not been stored, as is the case immediately after power is introduced to the terminal, then the identification information is regarded as being information that does not match and is stored at step 1004.

When storage of identification information has been carried out, the database that has been stored in the memory 9 is searched based upon the stored identification information and the position at which this wireless telecommunication terminal is present is specified (1005).

In the case of the PHS, this operation involves receiving the CS-ID specific to the base station (CS), searching the database in the memory 906 based upon the ID received, and effecting a conversion to the character codes of the specific place name of the location at which the base station exists. When the user subsequently performs an operation to start a call (1006) for the purpose of conversing with the communicating party, a connection to the communicating party is established after the operation for effecting a connection to the base station is performed in a manner similar to that of ordinary call processing (1007). When the connection to the communicating party has been made, the originating terminal sends the other party position information retrieved from its own (the originating terminal's) database (1008). In a case where the communicating party is a terminal that is capable of transmitting position information in the same manner as the originating terminal and position information sent from the communicating party has been received (1009), where the communicating terminal is located is displayed on the display unit 907 in accordance with the received position information (1010). The call is then placed to the communicating party (1011). In a case where the called party is a terminal that does not transmit position information, the terminal continues to be called. If the called party performs an operation to answer the call (1012), the call is established. If the originating side performs a disconnect operation before the other party answers (1014), the call is abandoned and processing ends (1015). It should be noted that processing on the side of a called party that has transmitted its position information is the same as the above-described processing executed when the calling side receives position information.

In accordance with this embodiment, it is so arranged that a wireless telecommunication terminal is provided with a database for obtaining a specific place name from identification information acquired from a base station. This makes it unnecessary to access an external database.

Further, it is possible to display position information even when the communicating party is a terminal that does not possess a database. Furthermore, since it is possible to communicate position information from a first party to a second party before the second party answers the call, the second party can use the location from which the call was placed by the first party as a factor in judging whether or not to respond to the call.

(Fourth Embodiment)

A fourth embodiment of the invention has a system configuration the same as that of the third embodiment (see FIG. 8).

Figure 11:
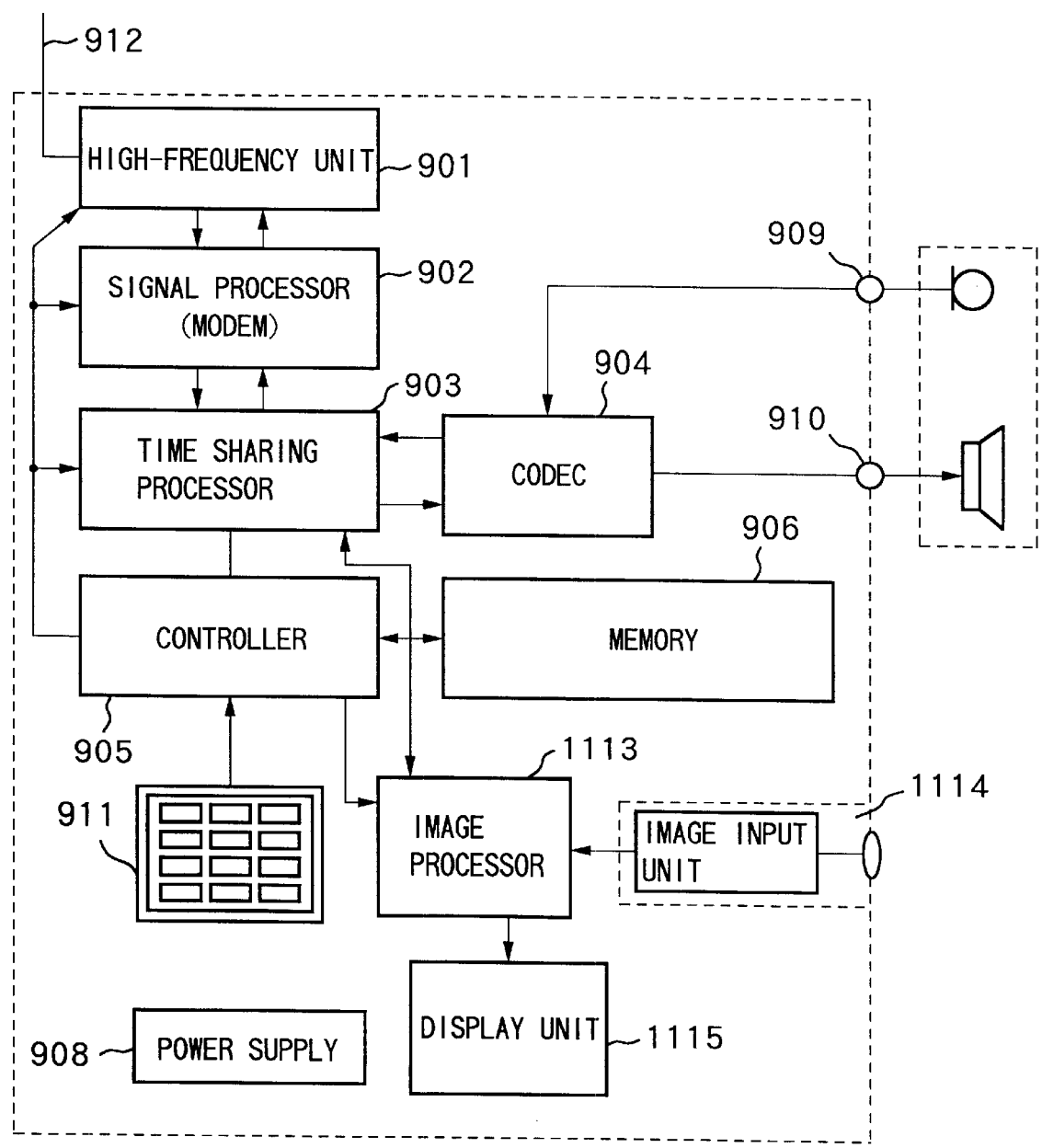
FIG. 11 is a block diagram of a wireless telecommunication terminal according to the fourth embodiment.

FIG. 11 is a block diagram of a wireless telecommunication terminal according to the third embodiment.

As shown in FIG. 11, the wireless telecommunication terminal includes an image processor 1113 for converting image data obtained from an image input unit 1114 to data having a format in which the data may be transmitted to a communicating party, and for outputting image data, which have been transmitted from the other party, to a display unit 1115.

Elements in FIG. 11 having reference numerals identical with those shown in FIG. 9 of the third embodiment are the same elements and need not be described again.

This embodiment is such that when communication starts, an image that has entered from the image input unit 1114 is converted by the image processor 1113 to a format for transmission and is then transmitted to the communicating party. On the receiving side, the received image is converted by the image processor 1113 to a format for display and is then displayed on the display unit 1115. Other operation is similar to that of the third embodiment.

In the third and fourth embodiments, it is so arranged that information representing the position of the calling side is transmitted to the communicating party. However, an arrangement may be adopted in which the telephone number of one's own terminal and the name of the possessor are stored in memory beforehand and transmitted together with the position information.

Further, in the third and fourth embodiments, the wireless telecommunication terminal specifies the position of the wireless base station whenever the base station changes.

However, an arrangement may be adopted in which the position of the wireless base station is specified when a call originating operation has been performed by the wireless telecommunication terminal.

In accordance with this embodiment, information relating to one's own position can be added on and transmitted during communication of an image.

(Fifth Embodiment)

Figure 12:
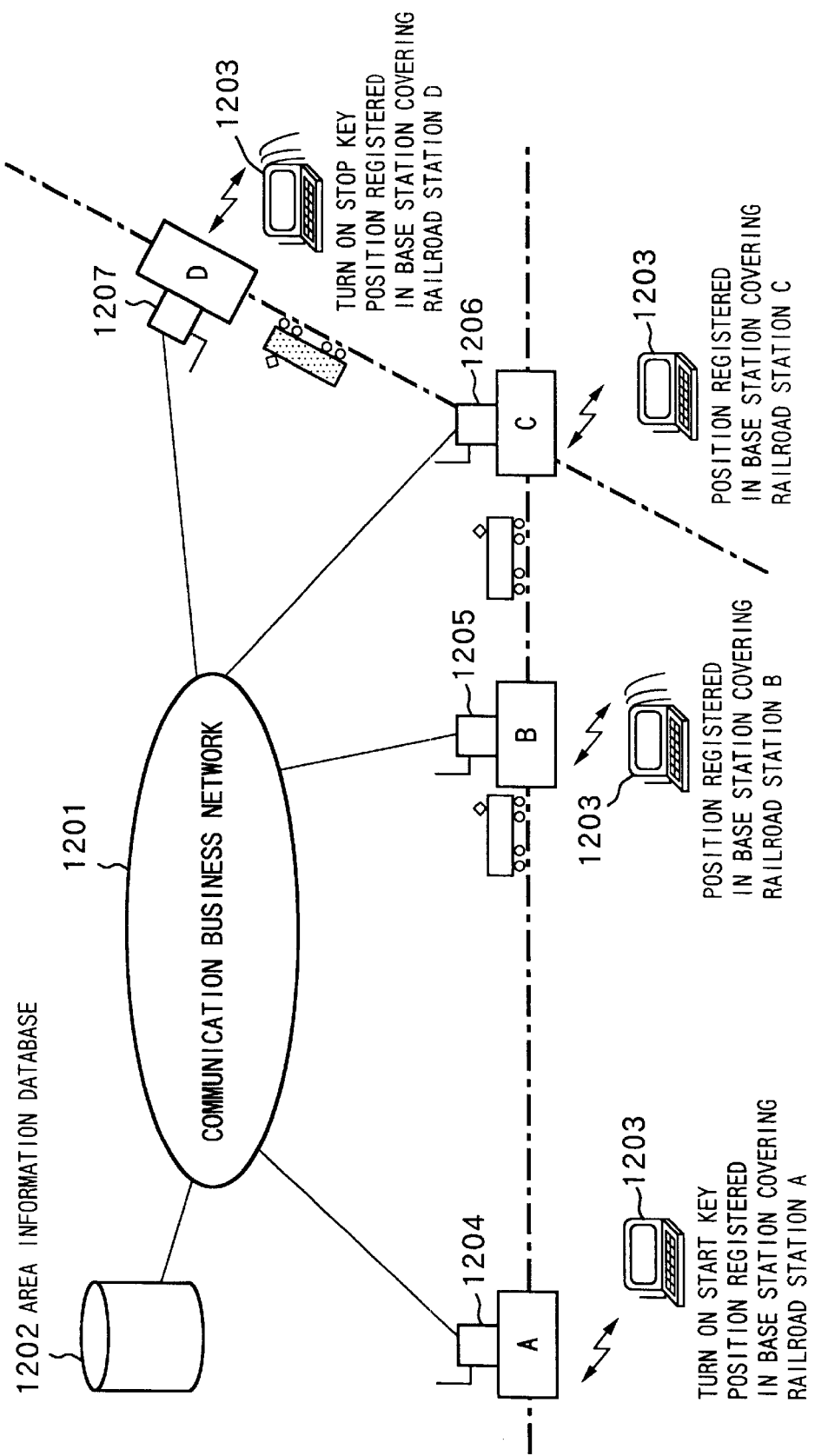
FIG. 12 is a diagram showing the system configuration of a wireless telecommunication system according to a fifth embodiment of the present invention.

A fifth embodiment of the invention will be now be described taking the PHS (Personal Handyphone System) as an example of a microcell wireless telecommunication system. FIG. 12 is a diagram showing the system configuration of the fifth embodiment. The system includes a network 1201 of PHS communication businesses, an area information database 1202 storing, in correlated form, identification information of wireless base stations and area information representing the locations at which the wireless base stations are deployed, a wireless telecommunication terminal 1203 having means for storing identification information, a base station 1204 which covers the area of a railroad station A, a base station 1205 which covers the area of a railroad station B, a base station 120 6 which covers the area of a railroad station C, and a base station 1207 which covers the area of a railroad station D.

Figure 13:
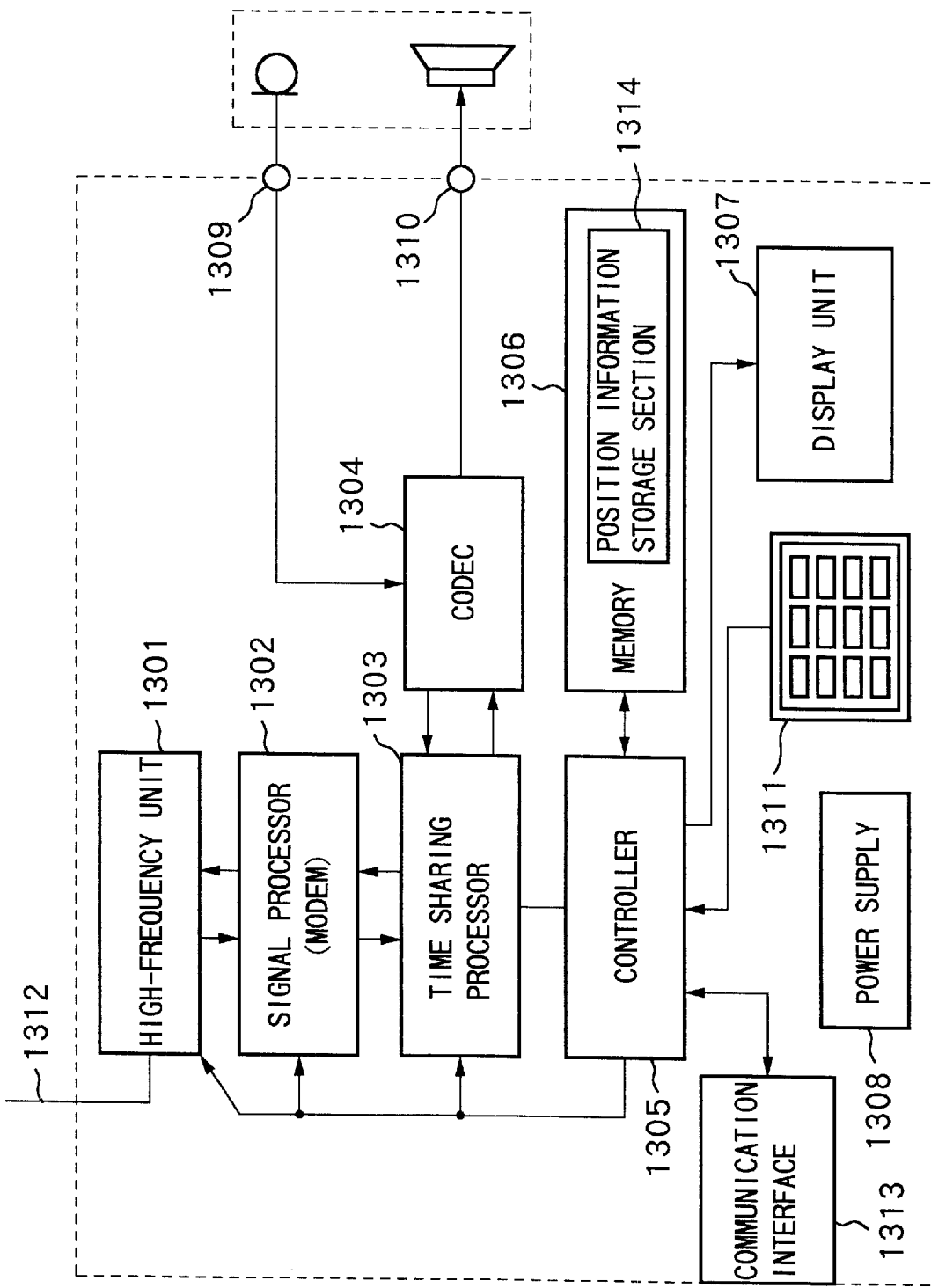
FIG. 13 is a block diagram of a wireless telecommunication terminal according to the fifth embodiment.

FIG. 13 is a block diagram of a wireless telecommunication terminal according to the fifth embodiment.

As shown in FIG. 13, the wireless telecommunication terminal includes a high-frequency unit 1301 for wireless communication with a base station, a signal processor 1302 for modulating and demodulating signals, a time sharing processor 1303 for analyzing data sent from a base station and assembling transmission data in a time-shared transmission format, a codec 1304 for converting an analog signal to a digital signal and converting a digital signal to an analog signal, a controller 1305 for implementing overall control of the wireless terminal, and a memory 1306 which includes a position information storage section 1314 for successively storing identification information. The memory 1306 stores data for retrieving the route and fare of a transportation facility from the location of a base station corresponding to identification information, and from the transition from one base station to the next, as well as a program executed by the controller 1305 to perform a variety of control operations. The wireless telecommunication terminal further includes a display unit 1307 for displaying information such as the route and fare of a transportation facility, a power supply 1308, audio input/output units 1309, 1310 for connecting a headset or the like, a keypad 1311 for entering start and end of an operation for storing identification information, an antenna 1312 for sending and receiving radio waves and a communication interface 1313 for implementing a connection to another information device.

The wireless telecommunication terminal has a database, which is located in the memory 1306, for specifying the position of a wireless base station from identification information received from the wireless base station. More specifically, the database stores, in correlated form, the CS-IDs allocated to wireless base stations and the positions of the wireless base stations, as shown in FIG. 14.

The wireless telecommunication terminal further has a database, which is located in the memory 1306, for calculating fare from the route of a transportation facility. An example of this database is shown in FIG. 15.

Figure 16:
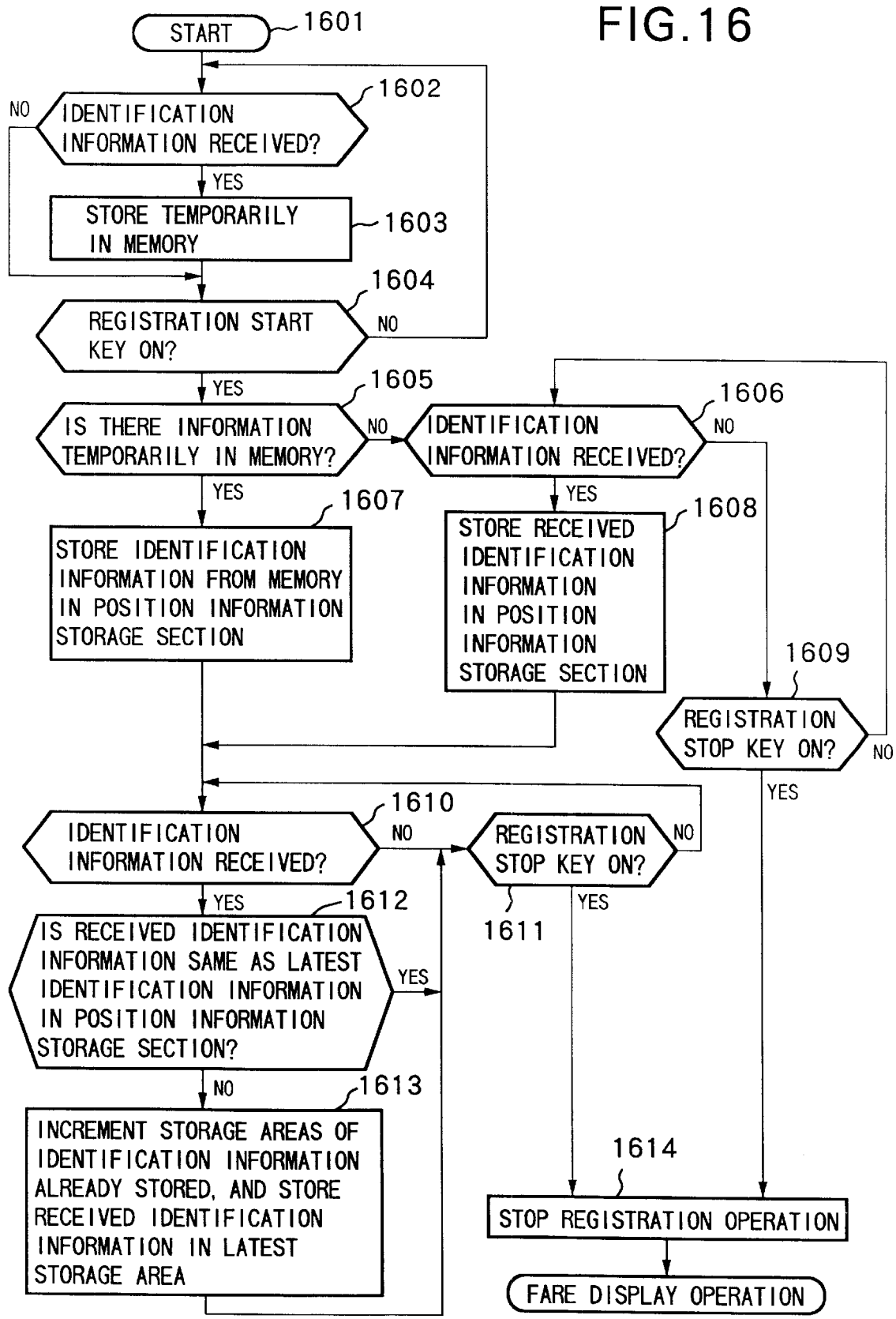
FIG. 16 is a flowchart of an identification information registration operation performed a wireless base station according to the fifth embodiment.
Figure 17:
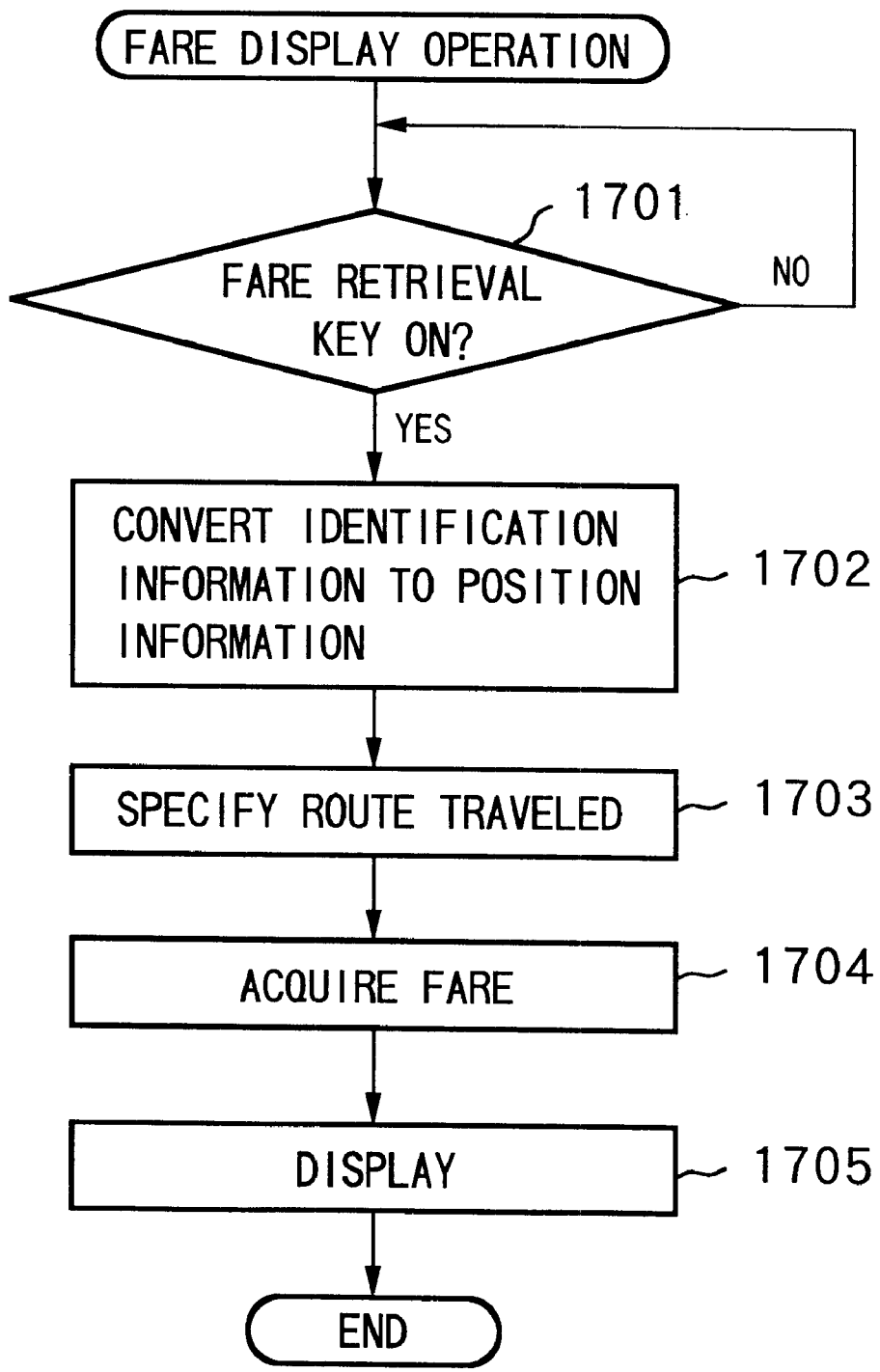
FIG. 17 is a flowchart of an operation for displaying a fare according to the fifth embodiment.

FIGS. 16 and 17 are flowcharts illustrating the operation of this embodiment. The operation of this embodiment will now be described with reference to these flowcharts.

With the wireless telecommunication terminal being in the powered state and in use (step 1601), it is determined whether identification information has been received from a base station (1602). If identification information has been received, it is stored temporarily in the memory 1306 (1603). Whether identification information has or has not been received, monitoring is performed to determine whether a recording start key on the keypad 1311 for designating the start of identification information registration is ON or not (1604). If the key is ON, it is determined whether identification information has been stored in the memory 1306 (1605). If identification information has been stored, then the information in the memory 1306 is stored in the position information storage section 1314 (1607). If identification information has not been stored, then monitoring is performed to determine whether identification information from a base station has been received (1606). If identification information has been received, then the received identification information is stored in the position information storage section 1314 (1608). If identification information has not been received, then monitoring is performed to determine whether a registration stop key on the keypad 1311 for designating the stop of identification information registration is ON or not (1609). If the key is ON, the registration operation is stopped (1614). If the key is not ON, then the state for monitoring reception of identification information is restored. In accordance with the operation described thus far, if the possessor of the wireless telecommunication terminal 1203 turns the registration start key ON at railroad station A in FIG. 12, for example, the identification information from the base station 1204 deployed at railroad station A will be stored in the position information storage section 1314. Next, wireless telecommunication terminal 1203 enters a mode in which it again waits for identification information from a base station (1610). If identification information is received, the received identification information is compared to determine whether it is identical with the latest identification information stored in the position information storage section 1314. If the identification information is the same, then the received signal is not subjected to special processing and monitoring of the registration stop key is monitored again (1611). When the registration stop key is turned ON, the registration operation is stopped (1614). If the registration stop key is not turned ON, then monitoring for reception of identification information resumes. In a case where the received information is different from the latest identification information stored in the position information storage section 1314, the storage areas of already stored identification information are incremented one at a time and the received identification information is stored in the latest storage area (1613). Monitoring of the registration stop key is then resumed (1611). When the registration stop key is turned ON, the registration operation is stopped (1614). If this key is not turned ON, monitoring for reception of identification information is resumed. By executing this processing, identification information transmitted from the base stations covering the areas of the respective railroad stations is stored in regular order in the position information storage section 1314 until the possessor of the wireless telecommunication terminal turns ON the registration stop key upon arriving at railroad station D after traveling from railroad station A via railroad stations B and C in FIG. 12.

It should be noted that the identification information thus stored may have the form of an identification information code received from a base station, or the form of data of a railroad station name obtained from the area information database storing the identification information of the wireless base stations and the corresponding area information representing the areas in which the base stations are deployed.

When the user of the wireless telecommunication terminal stops traveling, registration is completed and the user wishes to know what the fare is, the user turns a fare retrieval key ON (step 1701 in FIG. 17). When this is done, the database in the memory 1306 specifying the positions of the wireless base stations is searched based upon the identification information, the positions of the wireless base stations corresponding to the stored identification information are converted (to place names, etc.) (1702), and the route traveled by the wireless telecommunication terminal is obtained from the identification information as a history of place names (1703).

Next, the fare due from the user for using the transportation facility is acquired (1704) by determining the train boarding point, transfer points and train alightment point from the history of place names and searching the database that is for calculating the fare from the route traveled. The fare is then displayed on the display unit 1311 of the wireless telecommunication terminal (1705).

In accordance with this embodiment, the route traveled by the possessor of a wireless terminal can be specified even if the travel is by a subway, and the fare for using the transportation facility can be simply calculated from the route traveled.

Though this embodiment has been adapted to display a transportation fare, it can be adapted to display the route traveled. In addition, an arrangement may be adopted in which the route traveled or the transportation fare is communicated to another party and displayed on the side of this other party.

(Sixth Embodiment)

The fifth embodiment is such that the memory of the wireless telecommunication terminal has the database for specifying the position of a wireless base station from the identification information of the wireless base station and the database for calculating a fare from the route of the transportation facility. In a sixth embodiment of the invention, however, it is assumed that another information processing terminal connected to the wired telephone network is provided with the database for specifying the position of a wireless base station from identification information received from the wireless base station and the database for calculating the fare from the route of the transportation facility.

Figure 18:
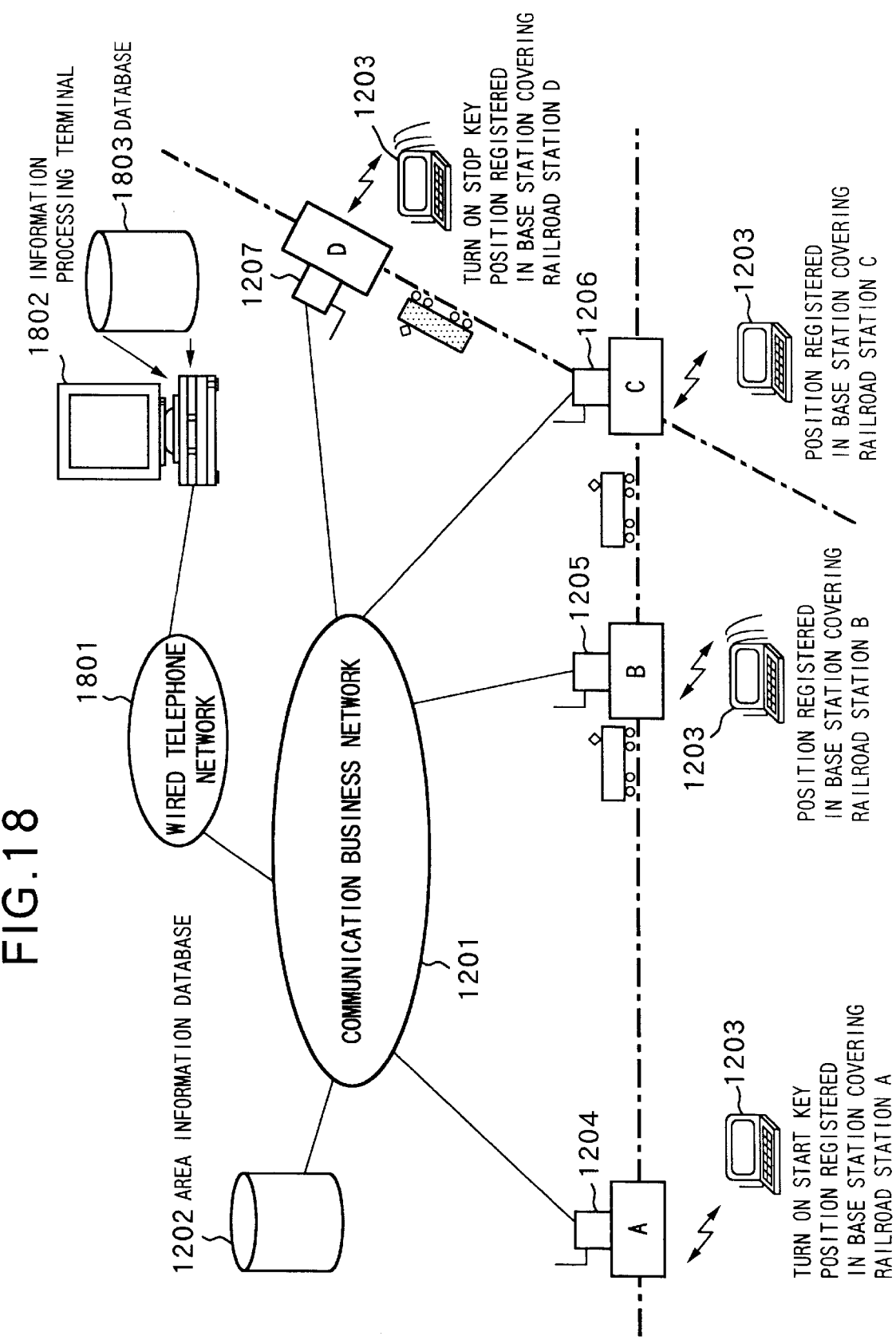
FIG. 18 is a diagram showing the system configuration of a wireless telecommunication system according to a sixth embodiment of the present invention.

FIG. 18 is a diagram showing the system configuration of the fifth embodiment.

As shown in FIG. 18, the system includes a wired telephone network 1801 to which an information processing terminal 1802 having a database is connected. Shown at 1803 is a database for specifying the position of a wireless base station from identification information received from the wireless base station and a database for calculating a fare from the route of the transportation facility. It is assumed that each database 1803 has been stored in a memory possessed by the information processing terminal 1802. Further, the databases 1803 have been stored in a format similar to that shown in FIGS. 14 and 15 in a manner similar to that of the fifth embodiment.

Elements in FIG. 18 having reference numerals identical with those shown in FIG. 12 are the same elements and need not be described again.

Figure 19:
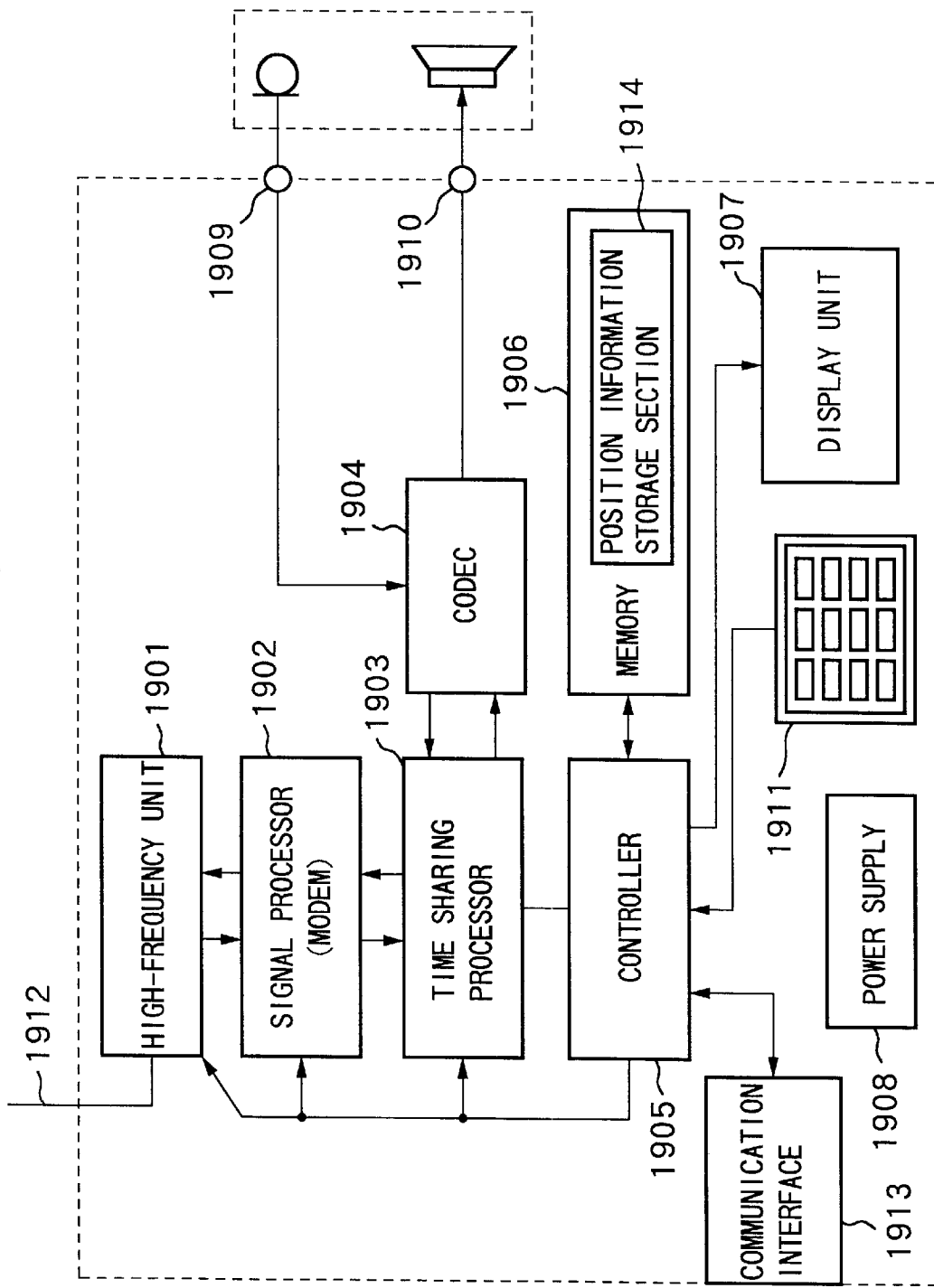
FIG. 19 is a block diagram of a wireless telecommunication terminal according to the sixth embodiment.

FIG. 19 is a block diagram of a wireless telecommunication terminal according to the sixth embodiment.

As shown in FIG. 19, the wireless telecommunication terminal includes a high-frequency unit 1901 for wireless communication with a base station, a signal processor 1902 for modulating and demodulating signals, a time sharing processor 1903 for analyzing data sent from a base station and assembling transmission data in a time-shared transmission format, a codec 1904 for converting an analog signal to a digital signal and converting a digital signal to an analog signal, a controller 1905 for implementing overall control of the wireless terminal, and a memory 1906 which includes a position information storage section 1914 for successively storing identification information indicative of wireless base stations. The memory 1906 stores the dialing number of the information processing terminal 1802 having the database for specifying the position of a wireless base station from identification information received from the wireless base station, and the database for calculating a fare from the route of the transportation facility. The wireless telecommunication terminal further includes a display unit 1907 for displaying information such as the route and fare of a transportation facility, a power supply 1908, audio input/output units 1909, 1910 for connecting a headset or the like, a keypad 1911 for entering start and end of an operation for storing identification information, an antenna 1912 for sending and receiving radio waves and a communication interface 1913 for implementing a connection to another information device.

The operation for storing identification information from wireless base stations in this embodiment is similar to that shown in FIG. 16 illustrating the fifth embodiment and need not be described again.

FIG. 20 illustrates operation when a fare is displayed according to this embodiment. When the user of the wireless telecommunication terminal stops traveling, registration of identification information is completed and the user wishes to know what the fare for use of the transportation facility is, the user turns a fare retrieval key ON (step 2001 in FIG. 20). When this is done, the wireless telecommunication terminal effects a connection to the information processing terminal 1802 using the dialing number of the information processing terminal 1802 that has been stored in the memory 1906 (2002). When the connection has been completed, the identification information that has been stored in the position information storage section 1914 is transmitted (2003).

Based upon the received identification information and the database 1803, the information processing terminal 1802 specifies the route traveled by the wireless telecommunication terminal, determines the train boarding point, transfer points and train alightment point from the route traveled and calculates the fare due from the user for utilization of the transportation facility. The fare and the route traveled are then transmitted to the connected wireless telecommunication terminal.

Upon receiving the route traveled and the fare from the information processing terminal 1802 (2004), the wireless telecommunication terminal temporarily stores the route traveled and the fare in the memory 1906, disconnects the information processing terminal (2005) and displays the route and the fare on the display unit 1907 (2006).

In accordance with this embodiment, the route traveled by the possessor of a wireless terminal can be specified even if the travel is by a subway, and the fare for using the transportation facility can be simply calculated from the route traveled.

Further, in a manner similar to that of the fifth embodiment, an arrangement may be adopted in which the information such as the route traveled and transportation fare is transmitted to a communicating party so that this information may be displayed on the side of this party.

Further, data storage capacity can be enlarged by providing the databases externally.

Further, the wireless telecommunication terminal can be reduced in size by providing the databases externally.

The first through sixth embodiments illustrate a system in which the Personal Handyphone System (PHS) serves as the wireless telecommunication medium. This is a microcell wireless telecommunication system having a position registration function. However, the same effects can be obtained even where the medium is a microcell wireless telecommunication system, which has a position registration function, such as a DECT (Digital European Cordless Telecommunication System) or PCS (Personal Communication Service System).

Thus, in accordance with the present invention as described above, a wireless telecommunication terminal can be provided with multiple functions through a simple arrangement by using a conventional automatic position registration function possessed by a microcell-type wireless telecommunication terminal.

Further, in accordance with the present invention, utilizing the automatic position registration function of a wireless telecommunication system makes it possible to communicate the position of a wireless telecommunication terminal and information about the terminal itself to a communicating party. In addition, since the location of the transmitting party and information regarding the transmitting terminal are received by the communicating party before the communicating party performs an operation to answer the call, the communicating party can use the received information to decide whether or not to answer. Such a wireless telecommunication terminal is extremely convenient.

As many apparently widely different embodiments of the present invention can be made without departing from the spirit and scope thereof, it is to be understood that the invention is not limited to the specific embodiments thereof except as defined in the appended claims.

What is claimed is:

1. A wireless communication system having a plurality of wireless base stations and a wireless communication apparatus, comprising:

receiving means for receiving identification information that is for identifying the wireless base station to which the wireless communication apparatus is connected in a case where the wireless communication apparatus is on a calling side;

memory means for storing position information indicative of positions of the wireless base stations corresponding to the identification information for identifying the wireless base stations;

setting means for setting whether or not to notify a communication apparatus on a called side of information relating to a position of the wireless communication apparatus on a calling side;

retrieval means for retrieving the position information, which has been stored in said memory means, based upon the identification information received by said receiving means;

notification means for notifying a communication apparatus on a called side of results of retrieval by said retrieval means; and control means for activating said notification means in accordance with the setting by said setting means.

2. The system according to claim 1, wherein said memory means and said retrieval means are provided in a database connected to each of said wireless base stations.

3. The system according to claim 2, wherein retrieval by said retrieval means and notification by said notification means are carried out using different communication channels.

4. The system according to claim 1, wherein said wireless communication apparatus has said memory means and said retrieval means.

5. The system according to claim 1, wherein said wireless communication apparatus has means for displaying the results of retrieval of which it has been notified by said notification means.

6. The system according to claim 1, wherein said retrieval means starts retrieval when an operation for originating a call is performed, and said notification means performs notification upon being connected to the communicating party after retrieval ends.

7. The system according to claim 1, wherein said notification means also notifies an operator of the results of retrieval.

8. The system according to claim 1, wherein said wireless communication system performs communication using a cellular method.

9. The system according to claim 1, wherein said wireless communication apparatus is a digital cordless telephone.

10. The system according to claim 1, wherein said wireless communication apparatus has storage means for storing plural items of identification information received by said receiving means.

11. The system according to claim 10, wherein said retrieval means retrieves a route traveled by the wireless communication apparatus based upon plural items of identification information that have been stored in said storage means.

12. The system according to claim 11, wherein said memory means stores a transportation fare required for travel based upon the route traveled by said wireless communication apparatus, and said retrieval means retrieves this transportation fare as well.

13. A wireless communication system having a plurality of wireless base stations and a wireless communication apparatus, comprising:

receiving means for receiving identification information that is for identifying the wireless communication apparatus in a case where the wireless communication apparatus is on a calling side;

memory means for storing information relating to the wireless communication apparatus corresponding to the identification information identifying the wireless communication apparatus;

setting means for setting whether or not to notify a communication apparatus on a called side of information relating to the wireless communication apparatus on a calling side;

retrieval means for retrieving the information relating to the wireless communication apparatus on the calling side, which has been stored in said memory means, based upon the identification information received by said receiving means;

notification means for notifying a communication apparatus on a called side of results of retrieval by said retrieval means; and control means for activating said notification means in accordance with the setting by said setting means.

14. The system according to claim 12, wherein said memory means and said retrieval means are provided in a database connected to each of said wireless base stations.

15. The system according to claim 14, wherein retrieval by said retrieval means and notification by said notification means are carried out using different communication channels.

16. The system according to claim 13, wherein said wireless communication apparatus has said memory means and said retrieval means.

17. The system according to claim 13, wherein said wireless communication apparatus has means for displaying the results of retrieval of which it has been notified by said notification means.

18. The system according to claim 13, wherein said retrieval means starts retrieval when an operation for originating a call is performed, and said notification means performs notification upon being connected to the communicating party after retrieval ends.

19. The system according to claim 13, wherein the information relating to the wireless communication apparatus is at least information relating to a dialing number of the wireless communication apparatus or to a possessor of the wireless communication apparatus.

20. The system according to claim 13, wherein said wireless communication system performs communication using a cellular method.

21. The system according to claim 13, wherein said wireless communication apparatus is a digital cordless telephone.

22. A wireless communication apparatus comprising:
receiving means for receiving identification information that is for identifying a wireless base station, to which the wireless communication apparatus is connected in a case where the wireless communication apparatus is on a calling side;
setting means for setting whether or not to notify a communication apparatus on a called side of information relating to a position of the wireless communication apparatus on a calling side;
notification means for notifying a communication apparatus on a called side of position information of the wireless base station based upon the identification information received by said receiving means; and
control means for activating said notification means in accordance with the setting by said setting means.

23. The apparatus according to claim 22, further comprising:
memory means for storing the position information of the wireless base station corresponding the identification information for identifying the wireless base station; and
retrieval means for retrieving the position information, which has been stored in said memory means, based upon the identification information received by said receiving means;
said notification means notifying the communication apparatus on the called side of results of retrieval by said retrieval means.

24. The apparatus according to claim 22, wherein said notification means transmits the identification information, which has been received by said receiving means, to a database connected to the wireless base station, and notifies of the position information received from the database.

25. The apparatus according to claim 22, further comprising display means for displaying the results of retrieval of which notification has been given by said notification means.

26. The apparatus according to claim 22, wherein retrieval of the position information which is notified to the communication apparatus on the called side by said notification means is performed when an operation for originating a call is performed, and said notification means performs notification upon being connected to the communicating party after retrieval ends.

27. The apparatus according to claim 22, wherein transmission to the database and notification to the communication apparatus on the called side by said notification means are carried out using different communication channels.

28. The apparatus according to claim 22, wherein said notification means also notifies an operator of the results of the position information.

29. The apparatus according to claim 22, wherein the apparatus performs communication using a cellular method.

30. The apparatus according to claim 22, wherein the apparatus is a digital cordless telephone.

31. The apparatus according to claim 22, further comprising storage means for storing plural items of identification information received by said receiving means.

32. The apparatus according to claim 31, wherein said notification means notifies of a route traveled by the wireless communication apparatus based upon plural items of identification information that have been stored in said storage means.

33. The apparatus according to claim 32, wherein said notification means notifies of a transportation fare required for travel based upon the route traveled by the wireless communication apparatus.

34. A method of controlling a wireless communication system having a plurality of wireless base stations and a wireless communication apparatus, comprising:
a receiving step of receiving identification information that is for identifying the wireless base stations to which the wireless communication apparatus is connected in a case where the wireless communication apparatus serves as a communication apparatus on a calling side;
a setting step of setting whether or not to notify a communication apparatus on a called side of information relating to a position of the wireless communication apparatus on a calling side;
a retrieval step for retrieving, from position information indicative of positions of the wireless base stations stored based upon the identification information for identifying the wireless base stations, the position information of the wireless communication apparatus based upon the identification information received at said receiving step;
a notification step of notifying a communicating party of results of retrieval at said retrieval step; and
a control step of activating said notification step in accordance with the setting set at said setting step.

35. The method according to claim 34, wherein said retrieval step is implemented by a database connected to each of said wireless base stations.

36. The method according to claim 35, wherein said retrieval step starts retrieval when an operation for originating a call is performed, and said notification step performs notification by connection to the communicating party after retrieval ends.

37. The method according to claim 35, wherein retrieval at said retrieval step and notification at said notification step are carried out using different communication channels.

38. The method according to claim 34, wherein said retrieval step is implemented by the wireless communication apparatus.

39. The method according to claim 34, wherein said notification step also notifies an operator of the results of retrieval.

40. The method according to claim 34, wherein said wireless communication system performs communication using a cellular method.

41. The method according to claim 34, wherein said wireless communication apparatus is a digital cordless telephone.

42. A method of controlling a wireless communication system having a plurality of wireless base stations and a wireless communication apparatus, comprising:
- a receiving step of receiving identification information that is for identifying the wireless communication apparatus in a case where the wireless communication apparatus is on a calling side;
- a setting step of setting whether or not to notify a communication apparatus on a called side of information relating to the wireless communication apparatus on a calling side;
- a retrieval step of retrieving, from information relating to the wireless communication apparatus corresponding to the identification information of the wireless communication apparatus, information relating to the wireless communication apparatus based on the identification information received at said receiving step;
- a notification step of notifying a communication apparatus on a called side of results of retrieval at said retrieval step; and
- a control step of activating said notification step in accordance with the setting set at said setting step.

43. The method according to claim 42, wherein said retrieval step is implemented by a database connected to each of said wireless base stations.

44. The method according to claim 43, wherein said retrieval step starts retrieval when an operation for originating a call is performed, and said notification step performs notification by connection to the communicating party after retrieval ends.

45. The method according to claim 43, wherein retrieval at said retrieval step and notification at said notification step carried out using different communication channels.

46. The method according to claim 42, wherein said retrieval step is implemented by the wireless communication apparatus.

47. The method according to claim 42, wherein the information relating to the wireless communication apparatus is at least information relating to a dialing number of the wireless communication apparatus or to a possessor of the wireless communication apparatus.

48. The method according to claim 42, wherein said wireless communication system performs communication using a cellular method.

49. The method according to claim 42, wherein said wireless communication apparatus is a digital cordless telephone.

50. A method of controlling a wireless communication apparatus, comprising:
- a receiving step of receiving identification information that is for identifying a wireless base station to which the wireless communication apparatus is connected in a case where the wireless communication apparatus is on a calling side;
- a setting step of setting whether or not to notify a communication apparatus on a called side of information relating to the wireless communication apparatus on a calling side;
- a notification step of notifying a communication apparatus on a called side of position information of the wireless base station based upon the identification information received at said receiving step; and
- a control step of activating said notification step in accordance with the setting set at said setting step.

51. The method according to claim 50, further comprising:
- a retrieval step of retrieving, from stored position information indicative of position of the wireless base station corresponding to the identification information for identifying the wireless base station, the position information based upon the identification information received at said receiving step;
- said notification step notifying the communication apparatus on the called side of results of retrieval at said retrieval step.

52. The method according to claim 50, wherein said notification step transmits the identification information, which has been received at said receiving step, to a database connected to the wireless base station, and notifies of the position information received from the database.

53. The method according to claim 50, wherein said wireless communication apparatus performs communication using a cellular method.

54. The method according to claim 34, wherein said wireless communication apparatus is a digital cordless telephone.

* * * * *

UNITED STATES PATENT AND TRADEMARK OFFICE
CERTIFICATE OF CORRECTION

PATENT NO. : 6,314,296 B1  
DATED : November 6, 2001  
INVENTOR(S) : Hamada et al.

It is certified that error appears in the above-identified patent and that said Letters Patent is hereby corrected as shown below:

Column 1,  
Line 42, delete "one s" and insert therefore -- one's --

Column 9,  
Line 50, delete "9" and insert therefor -- 906 --

Column 11,  
Line 22, delete "120 6" and insert therefor -- 1206 --

Column 17,  
Line 1, delete "claim 12", and insert therefor -- claim 13, --  
Line 49, delete "corresponding the" and insert therefor -- corresponding to the --

Signed and Sealed this

Tenth Day of September, 2002

Attest:

JAMES E. ROGAN  
*Attesting Officer*   *Director of the United States Patent and Trademark Office*